United States Patent [19]
Matsumoto et al.

[11] 4,139,278
[45] Feb. 13, 1979

[54] LIQUID CRYSTAL DISPLAY DEVICE

[75] Inventors: Seiichi Matsumoto; Tokuichi Tsunekawa; Takashi Uchiyama; Naoki Ayata, all of Yokohama; Yoji Matsufuji, Tokyo; Yukitoshi Ohkubo, Yokohama, all of Japan

[73] Assignee: Canon Kabushiki Kaisha, Tokyo, Japan

[21] Appl. No.: 709,077

[22] Filed: Jul. 27, 1976

[30] Foreign Application Priority Data

Jul. 31, 1975 [JP] Japan .................. 50-94057
Aug. 1, 1975 [JP] Japan .................. 50-93955
Aug. 9, 1975 [JP] Japan .................. 50-96901
Aug. 9, 1975 [JP] Japan .................. 50-96903

[51] Int. Cl.² .............................. G02F 1/13
[52] U.S. Cl. .......................... 350/332; 350/350
[58] Field of Search ............... 350/160 LC, 332, 350; 356/218, 227, 228; 354/23 R, 29, 56, 58, 60

[56] References Cited
U.S. PATENT DOCUMENTS

| | | | |
|---|---|---|---|
| 3,675,988 | 7/1972 | Soref | 350/160 LC |
| 3,727,527 | 4/1973 | Borowaki | 356/227 |
| 3,774,195 | 11/1973 | Schulthess | 350/160 LC |
| 3,818,495 | 6/1974 | Sagana | 354/53 |
| 3,820,875 | 6/1974 | Bohmer | 350/160 LC |
| 3,883,252 | 5/1975 | Ando | 356/227 |
| 3,994,595 | 11/1976 | Nobusawa | 356/227 |
| 4,039,252 | 8/1977 | Mizuno | 350/160 LC |
| 4,043,634 | 8/1977 | Nakamura | 350/160 LC |

*Primary Examiner*—Verlin R. Pendegrass
*Assistant Examiner*—Donald P. Walsh
*Attorney, Agent, or Firm*—Fitzpatrick, Cella, Harper & Scinto

[57] ABSTRACT

A liquid crystal display device has a power source, a voltage converter, a liquid crystal display cell and a control signal generator. The voltage supplied from the power source to the converter is converted into a voltage for operating the liquid crystal display cell and such converted voltage is supplied to the liquid crystal display cell while a control signal derived from the control signal generator is also applied to the liquid crystal display cell, thereby effecting display.

41 Claims, 69 Drawing Figures

(a)  (b)

(c)  (d)

(b)

(a)

(b)

(c)

(b)

(c)

(d)

(a)

(b)

LIQUID CRYSTAL DISPLAY DEVICE

BACKGROUND OF THE INVENTION

1. Field of the Invention

This invention relates to a liquid crystal display device, and more particularly to a liquid crystal display device using a liquid crystal display cell which comprises a pair of opposed substrates disposed with liquid crystal interposed therebetween and a resistance layer provided on that surface of one of the substrates which is in contact with the liquid crystal.

2. Description of the Prior Art

In order to convert the magnitude of a voltage applied into a position of a display surface, devices have heretofore been considered in which the voltage applied is analog-digitally converted, for example, and the digital signal is applied to a group of divided electrodes, whereas such devices have suffered from complexity of the circuit arrangement. To overcome such disadvantage, various means whereby analog signals may directly be analog-displayed have also been proposed in the display devices using liquid crystal.

In some of these devices, with the fact taken into account that the magnitude of the electric field between opposed electrodes is a function of the distance therebetween, the electrodes are opposed at non-uniform interval so that the operative location of the liquid crystal is varied by the magnitude of the applied voltage, thereby effecting the display.

There is another form of the liquid crystal display device in which one of two opposed electrodes of the liquid crystal display cell is divided into several electrode members and functional elements having different threshold voltages are coupled to these electrode members. This display device is such that when a voltage is applied to a common external connection terminal of the function elements, one of the functional elements whose threshold voltage is exceeded by the applied voltage is rendered operative and the liquid crystal display cell connected to that functional element is turned on so that the position display of the voltage is directly effected.

There is a further form of the display device in which liquid crystal display cells are connected together by a resistor so that the voltage applied to the liquid crystal display cells is varied by the resistor to thereby effect the display.

Among the various forms of liquid crystal display device mentioned above, the display device which effects position display in accordance with the magnitude of the applied voltage, by the use of a liquid crystal display cell comprising two electrodes opposed at non-uniform intervals positionally displays the magnitude of the applied voltage in accordance with the delay in response of the liquid crystal. The delay results from the different intensities of field imparted to different portions of the liquid crystal layer intervening between the two electrodes opposed to each other at non-uniform interval. Therefore, when a voltage exceeding the threshold voltage is applied, the display position varies depending on time and it is thus difficult to obtain reproducibility of the display positions. Further, if a voltage is applied for a time exceeding the aforementioned response time, the liquid crystal always throughout the entire display area of the liquid crystal display cell will become operative to effect only ON-OFF display, so that position display in accordance with the magnitude of the voltage will be impossible.

Also, these devices offer other various problems such as difficulties in regularizing the manufacturing conditions thereof, the high dependency on temperature and therefore, the necessity of eliminating the influence of the ambient temperature during operation.

Among the above-described liquid crystal display devices, those which do not utilize the intrinsic characteristic of the liquid crystal, but employ different functional elements connected to the liquid crystal, offer no essential problem in principle. Nevertheless, they are complicated and expensive to use and cannot be said to be commercially excellent.

In contrast, a display device based on the concept of imparting different voltage distributions to the liquid crystal layer from position to position thereof is theoretically possible and permits structural simplification. Therefore, realization of such display device is most eagerly desired. In fact, in an effort to realize such display device, several inventions have been proposed including that disclosed in Japanese Patent Publication No. 3642/1971 which uses a liquid crystal display cell utilizing the dynamic scattering mode (DSM) of the liquid crystal. In this device, a voltage distribution is imparted to one of two electrodes and a control voltage is imparted to the other electrode, whereby the position whereat the voltage is equal to the threshold voltage defines a boundary which divides the display surface into the under-threshold voltage area and the over-threshold voltage area, so that analog display is effected in the form of bar-like position display by a transparent portion and an emulsified portion.

As a further development of such invention, there has been proposed a device in which a number of bar-like displays similar to the aforesaid bar-like display are arrayed and voltage signals corresponding to changes of time are imparted to respective ones of the bar-like displays to effect oscillographic display (see Japanese Patent Publication No. 7377/1971), and an improvement over this device is the display device disclosed in Japanese Patent Publication No. 7391/1971.

A further device has also been proposed in which a film-like resistor is connected to divided electrodes to cause a similar effect.

However, these devices still offer various problems as will hereinafter be described, and have not yet been put into practice.

Firstly, the display by a liquid crystal display cell utilizing the DSM is effected by the change of condition between transparency and emulsification and cannot perform the essential color display. Secondly, the change of condition between transparency and emulsification cannot provide a sufficiently high optical contrast. Thirdly, the threshold characteristic of the liquid crystal display cell utilizing the DSM is originally slow and the boundary area of the display is unclear. Further, if a dope such as an electrolyte or the like is added to he liquid crystal to improve this, more current will flow through the liquid crystal layer to limit the performance and reduce the life of the cell.

Furthermore, in the display device which tries to make clear the boundary area by the use of divided electrodes, there is a disadvantage on the one hand that the display becomes a stepwise display instead of a continuous position change display and, thus, the display is not free of the limitations in steps of display. On the other hand, in the device using electrodes subdivided from the divided electrodes in an effort to effect an apparently continuous display, there is a disadvantage which is essentially attributable to the problem of unclear boundary area. In addition, machining of subdivided electrodes involves a high degree of technique in the manufacture and leads to an increased number of manufacturing steps which is commercially inconvenient. Also, even if the display method disclosed in the aforementioned Japanese Patent Publication No. 3642/1971 is utilized and a field effect mode (FEM) liquid crystal display cell is simply employed in place of the DSM liquid crystal display cell, the unclear display of the boundary area is essentially unavoidable. This is rather similar to the invention disclosed in Japanese Patent Publication No. 98599/1974 in that these are intended for the purpose of effecting tone display of color and brightness.

A further point in which the prior art methods including these are to be improved is the dependency of the threshold on temperature. In other words, for the same voltage applied, the boundary position is displaceable by temperature and this is conspicuous in the methods of the prior art. Thus, some auxiliary means for carrying out temperature compensation or the like becomes necessary to avoid such an effect and this in turn may result in complication of the device and accordingly, an increased number of manufacturing steps and greater cost of manufacture.

From another point of view, it has been very much desired to exploit a display device of simple circuit construction in which a plurality of different information signals may be applied as inputs to a display cell to provide a plurality of display outputs or to display a plurality of information signals and in which coincidence or non-coincidence between the plurality of information signals may be discriminated on the display surface.

However, if a display device having the above-described performance could be provided by the use of an ammeter or LED display cell which is the best-known display cell, the inertia of the movable portion of the ammeter would cause a slow response and when a plurality of different signals were alternately applied, the movable portion would repeat vibration about the average value of two inputs with the result that it would be impossible for a single display device to display two or more different display outputs apparently at a time. If the so-called 7-segment LED display cell were used to effect numerical display, the driving circuit therefor would be complex and in addition, a numerical display changing at short time intervals could not be read. Alternatively, the use of a dotted LED display cell would necessitate an AD converter circuit for converting analog signal inputs into digital signals and this would not only lead to complication of the circuit arrangement but also result in a stepwise display instead of a continuous display.

SUMMARY OF THE INVENTION

In view of the foregoing points, it is a primary object of the present invention to provide a novel liquid crystal display device which overcomes all of the various problems peculiar to the liquid crystal display devices of the prior art.

It is another object of the present invention to provide a liquid crystal display device which is operable by a low voltage and is low in power consumption rate and also has a very wide range of stable performance with respect to voltage fluctuation of the voltage source and load fluctuation.

It is still another object of the present invention to provide a liquid crystal display device which enables the boundary in the display area to be recognized by means of a clear contrast and which can perform the display including analog operation by the use of two or more voltages.

It is a further object of the present invention to provide a novel liquid crystal display device which can perform a plurality of information displays at a time and moreover enables coincidence between these different types of information to be recognized.

It is a further object of the present invention to provide a liquid crystal display cell which, in spite of being single, can provide a plurality of different display outputs by a plurality of different signals being alternately applied as inputs to the single liquid crystal display cell and which can provide a clear single display output when the plurality of display outputs are coincident with one another.

It is a further object of the present invention to provide a liquid crystal display device which is compact and light in weight and may be readily incorporated in a portable electric instrument or the like.

The above objects and other features of the present invention will become fully apparent from the following detailed description of the invention taken in conjunction with the accompanying drawings.

DESCRIPTION OF THE PREFERRED EMBODIMENTS

The liquid crystal display device according to the present invention has alternating current output means, a liquid crystal display cell, and control signal output means, wherein an AC voltage from the above-mentioned AC output means and an AC control signal from the above-mentioned control signal output means are phase-synchronized, and enable a display when they are fed to the liquid crystal display cell as inputs. The AC output means consists, for example, of a combination of a power source and converting means, while the control signal output means consists, for example, of a combination of control means and signal input means The liquid crystal display device of the present invention will further be described by reference to the drawings.

Figure 1:
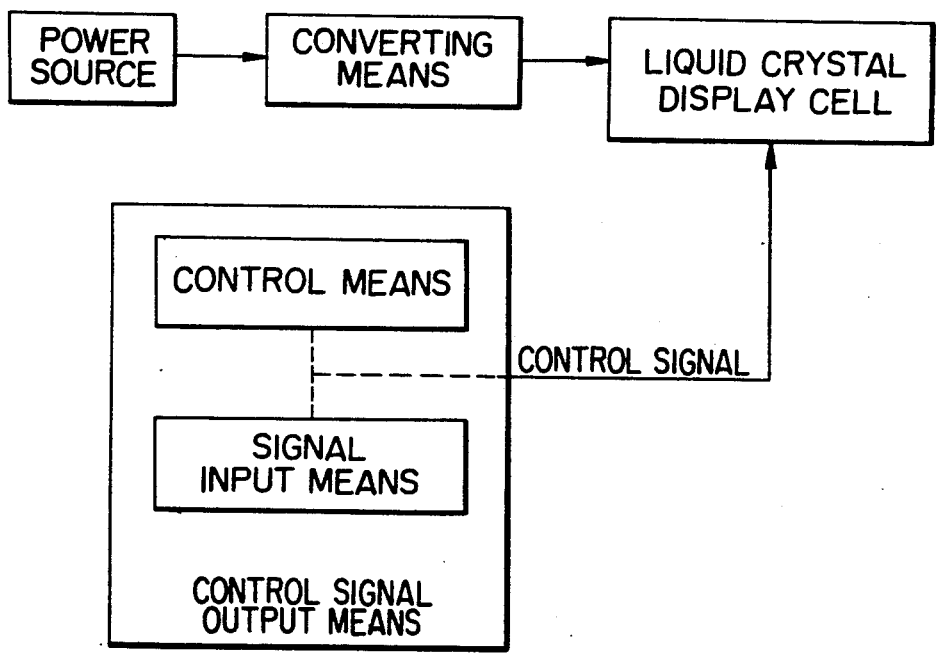
FIG. 1 is a block diagram showing the basic construction of the liquid crystal display device according to the present invention.

Referring to FIG. 1 which is a block diagram showing the basic construction of the liquid crystal display device according to the present invention, the display device comprises a power source, converting means, liquid crystal display cell and control signal output means, which comprises control means and signal input means.

In FIG. 1, in order that the liquid crystal display cell may be driven to effect the display of information signals, a voltage A is supplied from the power source to the converting means for convertion into a voltage B, which is in turn put out and supplied from the converting means to the liquid crystal display cell, while a control signal controlled in accordance with the setting of information is produced by the control signal output means and applied to the liquid crystal display cell, whereby display takes place on the display surface of the liquid crystal display cell. Display may also be accomplished by preapplying a first information signal to the control means and supplying a second information signal from the signal input means to the control means to put out therefrom a control signal formed upon application of these two signals and by supplying the control signal to the liquid crystal display cell.

Figure 2:
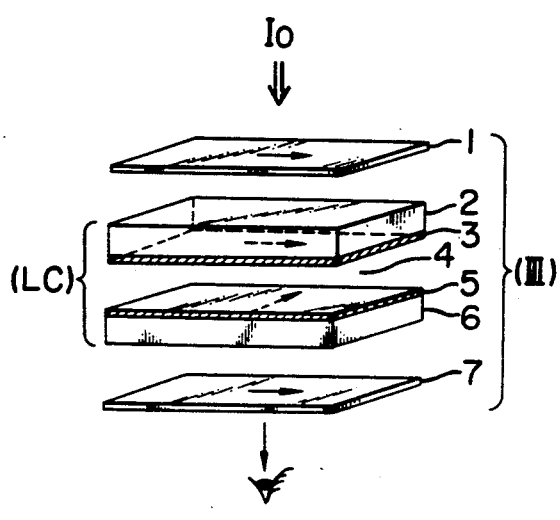
FIG. 2 and FIGS. 3(a), (b) and (c) are schematic views illustrating a basic construction of the liquid crystal display cell used in the liquid crystal display device according to the present invention.

FIG. 2 shows a basic construction of the liquid crystal display cell (III) used in the liquid crystal display device of the present invention. The liquid crystal display cell (III) shown there is of such a construction that a liquid crystal cell LC is disposed between two polarizing plates. There is seen a first polarizing plate 1, a first substrate 2, a resistance layer 3 formed on the substrate 2, a space 4 to be filled with nematic liquid crystal, a second substrate 6, an electrically conductive layer or a resistance layer 5 formed on the second substrate 6, and a second polarizing plate 7. In FIG. 2, the liquid crystal display cell (III) is shown as being of the transmitting type, whereas if a reflection type liquid crystal display cell is desired, a diffusive reflector plate may be disposed behind the polarizing plate 7.

Figure 3A:
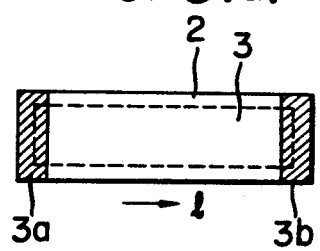

Referring to FIG. 3(a) which is a plan view of the substrate 2, the resistance layer 3 is formed on the substrate 2 and electrode portions (terminal electrodes) 3a, 3b of good conductivity are formed on at least two separate areas of the resistance layer 3.

Figure 3B:
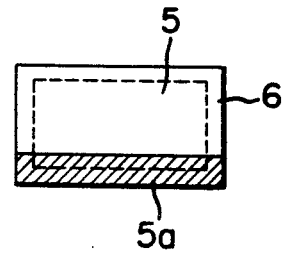

Referring to FIG. 3(b) which is a plan view of the substrate 6, a conductive layer or a resistance layer is formed on the substrate 6 and has at least one electrode portion (terminal electrode) 5a of good conductivity. The liquid crystal display cell (III) may be constructed by disposing the two substrates in parallel opposed relationship with a clearance usually of about 4 to about 50 microns provided therebetween, filling the clearance with the nematic liquid crystal which presents a field effect, arranging these between the two polarizing plates, making the terminal electrodes connectible to an external circuit (see FIG. 3(c), in which the liquid crystal display cell (III) is shown only schematically and numeral 3 designates the resistance layer on the substrate 2 with numeral 5 designating the conductive layer on the substrate 6), and hermetically sealing the entire assembly.

Figure 4:
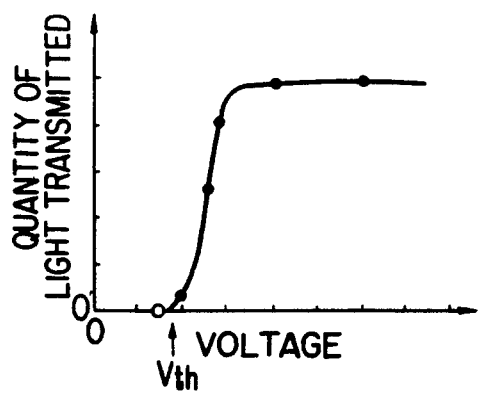
FIGS. 4 and 5 are graphs illustrating the electrooptical characteristic of the liquid crystal display cell used in the liquid crystal display device according to the present invention.
Figure 5:
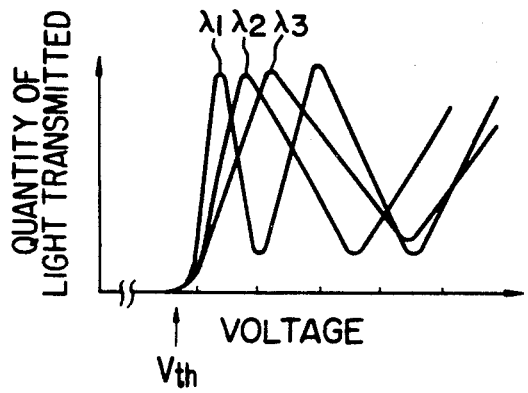

FIGS. 4 and 5 illustrate an example of the electro-optical characteristic of the liquid crystal display cell (III) used in the liquid crystal display device of the present invention. In FIGS. 4 and 5, the abscissa represents the voltage and the ordinate represents the quality of light transmitted. The characteristic illustrated in FIG. 4 refers to the case where use is made of a twisted nematic field effect mode liquid crystal display cell (TN-FEM cell), and the characteristic illustrated in FIG. 5 refers to the case where use is made of a field effect mode liquid crystal display cell of the deformation of vertically aligned nematic liquid crystal phase type (DAP-FEM cell). The characteristic of the TN-FEM cell is for measurement by white light and the characteristic of the DAP-FEM cell is for measurement by monochromatic lights of three wavelengths $\lambda_1$, $\lambda_2$ and $\lambda_3$.

In FIGS. 4 and 5, the voltage at which the electro-optical modulation of each of the two types of cell begins to take place is the threshold voltage, indicated as Vth. In the TN-FEM cell, the Vth is as low as about 1 to about 3 volts and in the DAP-FEM cell, the Vth is about 3 to about 6 volts. Thus, as compared with the DSM cell utilizing the DSM, both of these two cells have sufficiently low threshold voltages.

The FEM type liquid crystal display cells exhibiting the low threshold characteristic further include those modified from the TN-FEM type or the DAP-FEM type, and these modifications are obtained by modifying the orientation of the liquid crystal or by modifying the display detection method using polarizing plates or the like. There are also available liquid crystal display cells in which a dichromatic coloring matter is added to the liquid crystal layer so that the color change resulting from the change in orientation may be directly recognized without the use of any polarizing plate.

Any of these liquid crystal display cells having low threshold characteristics may be employed in the liquid crystal display device of the present invention, and it will particularly be very effective to employ the TN-FEM cell which has the lowest Vth among all the known types of liquid crystal cells.

Figure 6:
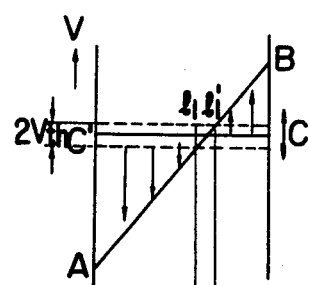
FIGS. 6 to 8 illustrate the display principle of the liquid crystal display cell shown in FIG. 2 and FIGS. 3(a), (b) and (c).
Figure 7:
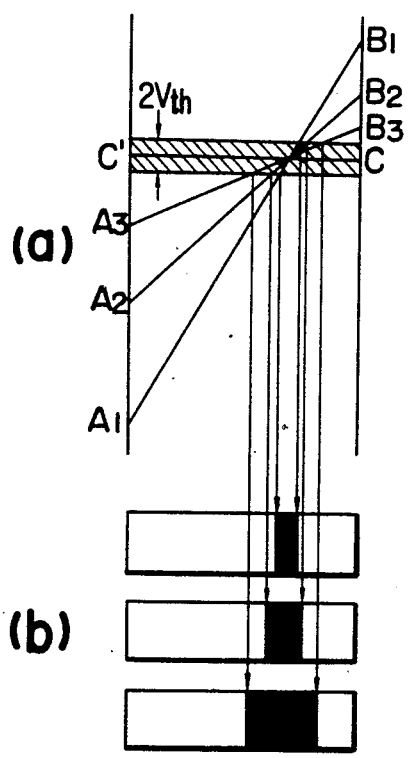
Figure 8:
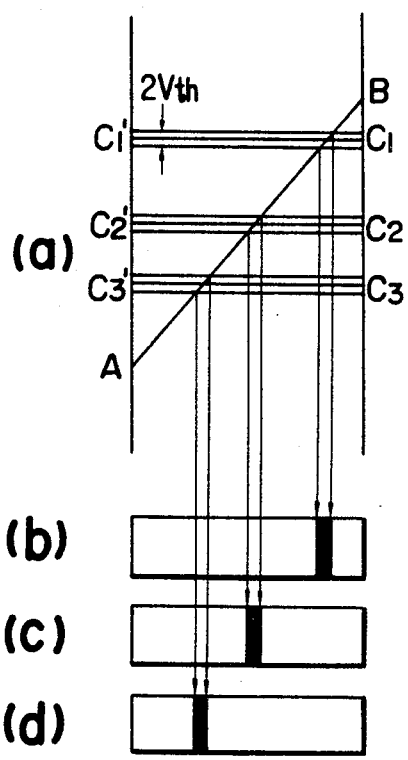

Reference will now be had to FIGS. 6 to 8 to describe the liquid crystal display cell shown in FIG. 2 and FIGS. 3(a), (b) and (c).

Figure 3C:
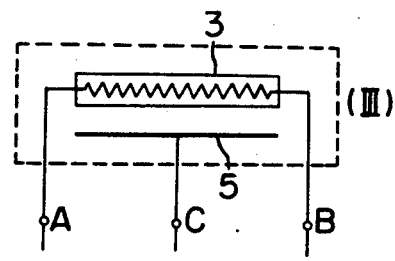

In FIG. 6(a) wherein the abscissa represents the lengthwise direction 1 of the display surface of the resistance layer 3 shown in FIG. 2 and the ordinate represents the voltage, a straight line AB represents the potential gradient produced between points A and B in FIG. 3(c) by the uniform resistance layer 3 when a voltage is applied between A and B. On the other hand, where the layer 5 in FIG. 3 is a low resistance layer having a sufficiently lower resistance than that of the resistance layer 3 or a conductive layer, no potential gradient occurs in the surface of the layer 5 and this is represented by a horizontal straight line CC'. The voltage distribution then taking place in the liquid crystal display cell (III) is represented between the straight lines AB and CC', as indicated by several arrows in FIG. 6, but actually the voltage distribution is continuous.

The electro-optical characteristic of any liquid crystal display cell used in the present invention lacks polarity (± or directionality) and if the width of ±Vth is considered with CC' at the center, the threshold voltage of the cell is 2Vth and therefore, in the band-like area of 2Vth, no electro-optical modulation takes place within the area $l_1l_1$, indicated by the arrow representative of the potential difference.

The display condition in such a case is shown in FIG. 6(b), wherein the rectangle represents the entire display area while the non-modulation area (A) corresponding to the area $l_1l_1$, represents the display portion. Thus, according to the present invention, it is possible to provide a display appearing as a dot or a line by sufficiently increasing the area (B) in which the threshold voltage of the liquid crystal display cell is exceeded with respect to the area (A) in which the threshold voltage is not exceeded.

More particularly, the liquid crystal display device of the present invention can effect display non-stepwisely at any desired position within the entire display area by the variation in the potential gradient between A and B (represented by the gradient of the straight line AB) or by the variation in the potential level of C (represented by the vertical displacement of the straight line CC'). In other words, such display device can effect a perfect analog display.

FIG. 7(a) refers to the case where the potential gradient between A and B in FIG. 6 is varied and FIG. 7(b) shows the variations in the display resulting therefrom. The potential gradient is decreased in accordance with the subscripts 1, 2 and 3. The display then taking place is such that as the potential gradient is greater, the non-modulation area is smaller and the line width narrower. FIG. 8(a) refers to the case where the potential gradient between A and B is constant but the potential level of C is varied, and the display taking place in such case is shown in FIGS. 8(b), (c) and (d).

Thus, in applications of the present invention, to obtain a basic performance, the signal for varying the potential gradient between A and B and the signal for varying the potential level of CC' may be used independently from each other or both of these signals may be used at a time, whereby the position and the width may be displayed individually or both at a time, thus providing a certain kind of functional display. For example, in the position display, such an application may occur to mind that the received radio frequency is displayed and the display width thereof indicates the tuning of the received frequency with respect to the transmitted frequency. The liquid crystal display device of the present invention will also find various applications in the spectroscope, one of which applications is to display the center wavelength of the spectral light by the position and display the bandwidth thereof by the line width.

Summing up the liquid crystal display cell used in the present invention, it uses the field effect type liquid crystal and utilizes the well-known crysto-optical detection method to detect and recognize that the dipole moment possessed by the liquid crystal molecules is changed from its initial orientation to other orientation in response to an electric field.

Thus, the simplest optical detecting means used in the above-described crysto-optical detection method is to use polarizing plates. In the present invention, no special restriction is imposed on the polarizing plates with the exception that they should be suitably selected in accordance with visual prominence such as apparent contrast or brightness. For example, the first and second polarizing plates 1 and 7 may be linearly polarizing plates. Various types of linearly polarizing plates differing in degree of polarization and transmission factor are commercially available and may be obtained easily and inexpensively. A typical one is the polarizing plate which comprises a lamination of a base film of acetate or the like and a PVA film treated with iodine oriented therein, and this is commercially obtainable very easily and inexpensively. The arrangement (polarizing surface) of these polarizing plates, in case of the TN-FEM cell, is indicated by arrows in FIG. 2. The arrow seen on the polarizing plate 1 indicates the plane of polarization, the arrow seen on the resistance layer 3 indicates the orientation of the liquid crystal molecules on the surface of such layer, and the arrow seen on the layer 5 indicates the orientation of the liquid crystal molecules on that surface of the layer 5 which faces the resistance layer 3. The molecules of the liquid crystal poured between them present a gradually twisted orientation within the angle formed by the two dotted arrows. The arrow on the polarizing plate 7 represents the plane of polarization thereof. This polarizing plate 7 serves to detect the light emergent from the liquid crystal cell LC. In FIG. 2, the orientation of the molecules of the liquid crystal is shown to be twisted by 90°.

In FIG. 2, the incident light Io directed downwardly in the drawing has its plane of polarization regularized in accordance with the plane of polarization of the polarizing plate 1 and as it passes through the liquid crystal layer between the resistance layer 3 and the layer 5, the light has its plane of polarization rotated by an angle corresponding to the twisted orientation of the molecules of the liquid crystal and enters the second polarizing plate 7. If the plane of polarization of such light forms an angle of 90° with the plane of polarization of the polarizing plate 7, the incident light Io will be intercepted thereat, so that the viewer below the polarizing plate 7 may recognize it as dark.

When an electric field is applied to the liquid crystal cell LC, the molecules of the liquid crystal are oriented with the major axis thereof being perpendicular to the plane of the substrate and, at this time, the liquid crystal is isotropic with respect to the incident light Io so that the plane of polarization of the incident light is not rotated. Thus, if the directions of polarization of the two polarizing plates are parallel, the light may be transmitted therethrough to enable the viewer to recognize it as light, in contradistinction with the above-described case where no voltage is applied.

This difference corresponds to the difference between the state in which the directions of polarization of the two polarizing plates are parallel to each other and the state in which they are orthogonal. If, in contrast, only one of the two polarizing plates is rotated by 90°, namely, if the directions of polarization of the two polarizing plates 1 and 7 are disposed orthogonal, there will be provided a state in which the aforesaid negative/positive relationship has been reversed.

In case of the DAP-FEM cell and when no voltage is being applied, the molecules of the liquid crystal are oriented perpendicular to the planes of the two substrates and accordingly they are in an isotropic state, whereas when the voltage is applied, the molecules assume an anistropic state, so that a change in the light-dark display may be provided in contrasting relationship with the TN-FEM cell.

Description will now be made of a method of chromatic display in contrast with the above-described light-dark display.

For chromatic display, one of the linearly polarizing plates is replaced by a circularly polarizing plate. The circularly polarizing plate comprises a linearly polarizing plate having a quarter wavelength plate laminated thereon, and enables dichromatic display to be accomplished due to the dependency on wavelength of the phase difference between the polarized light passed through the modulating area of the liquid crystal cell LC and that passed through the non-modulation area. Another method of chromatic display is, in case of TN-FEM cell shown in FIG. 2, to rotate the directions of polarization of the polarizing plates by 45° each in one direction with respect to the orientation of the molecules, thereby accomplishing the coloring most efficiently. In the DAP-FEM cell, the inclination of the molecules caused by the field has a great tendency toward gradual variation and, as illustrated in FIG. 5 which shows the characteristic of such cell for achromatic light, the characteristic of the quantity of light transmitted with respect to the voltage is variable by wavelength and, therefore, a rainbow-like striped pattern tends to occur in the vicinity of the threshold voltage or in the boundary between the modulation area and the non-modulation area. The TN-FEM cell also suffers from a similar phenomenon, but in such cell this phenomenon is less conspicuous as the voltage is lower and it does not lead to any serious problem. Moreover, in the method of display by the liquid crystal cell employed in the present invention, said phenomenon is of a negligible degree which would offer no problem in practice.

Where a circularly polarizing plate or a polarizing plate having its plane of polarization offset by 45° is used in a display cell having two substrates disposed in non-parallel relationship, it will be possible to effect simultaneous multicolor display wherein the display colors differ from one display position to another.

Further, the use of color polarizing plates or color filters would also enable color display to be accomplished by the transmitted light in its light state to thereby attain an effect similar to that described above, although this is not essentially a chromatic display.

As an auxiliary means for the display effected by the use of polarizing plates, illumination, lighting or like means may be added to any of the transmission, the reflection and the projection methods, depending on the situation in which the display is read.

In case of the transmission type liquid crystal display cell, a greater effectiveness will be obtained by providing a diffusive transmitting plate on the back side of the cell to enhance the legibility of the display. Also, where extraneous light or illumination light enters the display cell from the viewer side, the provision of a diffusive reflector plate on the back side of the cell (namely, the reflection type cell) will be more effective.

A further method may suitably be adopted whereby an illumination source is disposed on the back side of the cell so that the light may be projected directly or through an optical system (lens system) upon a transmission type screen or a reflection type screen to thereby effect display. The substrates 2 and 6 may be formed of a material which can provide a conductive layer or a resistance layer, usually a transparent substrate material, but in case of the reflection type liquid crystal display cell, at least the substrate forming the front side of the cell need only be transparent and not both of the two substrates need be transparent.

As the material for the substrates, the use of glass which is hard and excellent in planarity is most popular in the sense that the spacing between two opposed substrates may be maintained constant, but other material such as transparent, translucent or opaque ceramics, quartz or plastics may also be used.

Any liquid crystal which will be suited for the liquid crystal display device of the present invention may be employed in the present invention, and the nematic liquid crystal for TN-FEM or DAP-FEM is particularly suitable.

The liquid crystal available for TN-FEM is the nematic liquid crystal having a positive dielectric anistropy in which the dipole moment of molecules is orientated in the direction of the major axis of the molecules (hereinafter abbreviated as Np liquid crystal). Such a type of liquid crystal, when used in a composition, need only satisfy the condition that the ultimate composition have a positive dielectric anistropy and, therefore, such liquid crystal may have mixed therewith a negative dielectric anistropic substance for adding to some other effect, or an additive for assisting in orientation.

The preferable Np liquid crystal usable with the present invention may be chosen from among liquid crystals belonging to Schiff's salt, ester, azo, azoxy and biphenyl. Typical Np liquid crystals are mentioned below.

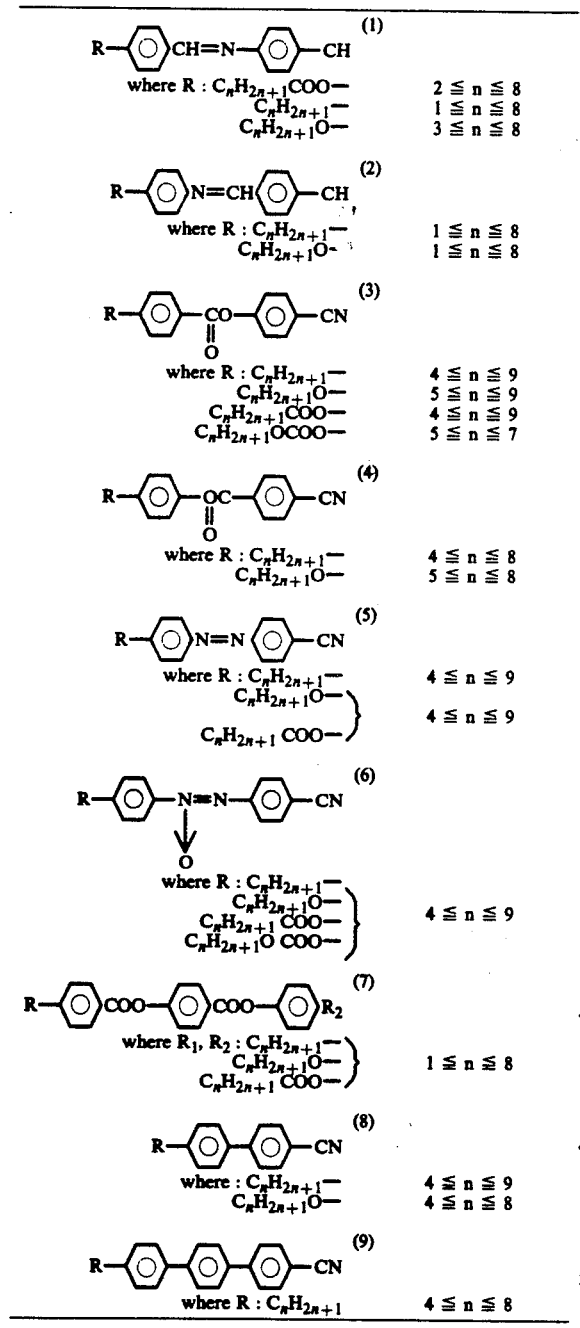

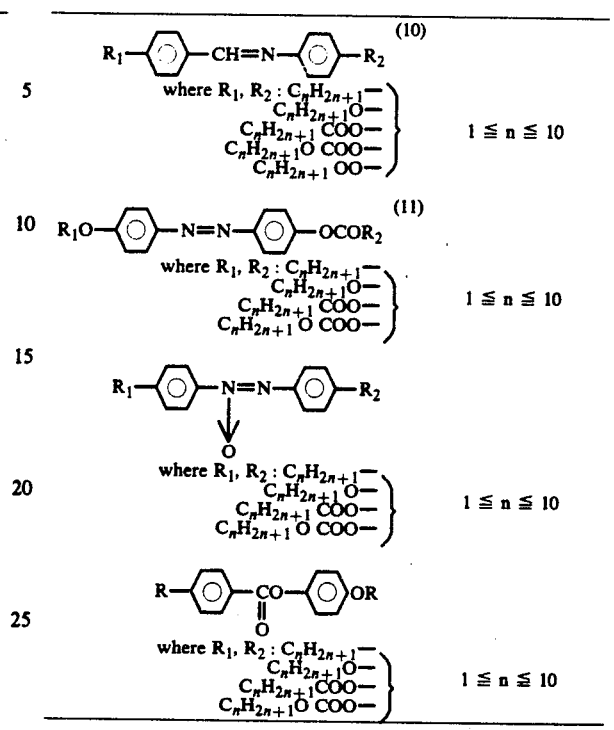

These liquid crystals are not only usable in the form of a simple substance but also may be suitably mixed with other substances to provide a desired electro-optical characteristic, a desired nematic crystal temperature range, a desired service life, etc.

As the liquid crystal for DAP-FEM cell, use may be made of nematic liquid crystal having a negative dielectric anistropy (hereinafter abbreviated as Nn liquid crystal). Such a type of liquid crystal, when used in a composition, need only satisfy the condition that the ultimate composition exhibit a negative dielectric anistropy and, therefore, such liquid crystal may have mixed therewith some other additive for imparting some other effect. Typical Nn liquid crystals are mentioned below.

These liquid crystals are not only usable in the form of simple substance but also may be mixed with other substances to provide a desired electro-optical characteristic, a desired liquid crystal temperature range and other desired characteristics.

The fundamental requirements imposed on the liquid crystal composition for the TN-FEM cell used with the present invention are a wide nematic liquid crystal temperature range and a long and stable service life, and particularly a low threshold characteristic is preferred.

In this sense, the liquid crystal for a TN-FEM cell should preferably have a great degree of dielectric anistropy and accordingly, a great dipole moment in the direction of the molecule axis.

Preferable materials used for the resistance layer 3 are metal oxides such as $In_2O_3$, $SnO_2$, $SiO$, $SiO_2$, $Zr_2O_3$, $TiO_2$, $Fe_2O_3$, $CO_2O_3$, $Cr_2O_3$, $CdO$, $Y_2O_3$, etc. Also, in order to enhance the conductivity as required, it will be effective to increase the purity of the material or to subject the material to doping. Most of these metal oxides present the characteristic of n-type semiconductor and if a high resistance value is desired for them, addition of a dopant corresponding to the acceptor of these materials, for example, addition of Cd, Zn, Hg or the like to $In_2O_3$, will sometimes be effective.

Needless to describe in detail, the resistance value of the resistance layer 3 may also be controlled by the thickness thereof and may further be regulated by the condition of filming, such as, for example, the condition of heat treatment, and therefore the material and filming condition for such layer may be suitably selected as desired. Furthermore, the material for this layer may also be selected in terms of durability, filmability, transparency, economy, etc.

Light transmitting organic semiconductors are also usable as the material for the resistance layer and, for example, anthracene and polycarbazole are well-known among them.

These should of course be chosen from among the materials which will not adversely affect the liquid crystal.

Further materials preferable for use as the resistance layer include polyvinylpyrene, polyvinylacridine and polyvinylanthracene which have filmability.

It is preferred that the resistance value of the resistance layer formed of any of the organic or inorganic materials mentioned above be relatively high. The reason is that the voltage applied to the resistance layer will cause a flow of current which will produce the so-called Joule heat which may, in turn, cause a temperature rise of the liquid crystal above its performance temperature and the loss of power will be great.

In this sense, the resistance value of the resistance layer 3 may actually be in the range of 10 KΩ to 100 MΩ across the terminal. If the layer 5 is used as a resistance layer, the material and other conditions for the resistance layer should be chosen in the same manner as described with respect to the resistance layer 3.

Further, if the layer 5 is used as a conductive layer, such layer may be formed by a conductive film of metal oxide such as $SnO_2$ or $In_2O_3$ or a thin film of metal such as Au, Al or Ag.

The areas of the resistance and conductive layers must be determined as by varying the sizes thereof with the capacity taken into account in accordance with the driving frequency. At the same time, the magnitude of the capacity may be varied by varying the distance between the two opposite poles.

In addition, where the layer 5 is formed as a conductive layer, the material for such layer may be of a lower resistance value than that of the resistance layer 3 and selected from among materials of low resistance value rather than selected by the essential difference of the material.

Thus, if the desired conductive layer (layer of low resistance value) could not be obtained from any of the above-mentioned materials and under the usual manufacturing conditions, an additive which will be a donor may effectively be added as dopant to an extremely thin film of metal, for example, Sb, Bi, As or P may be added to $In_2O_3$.

The terminal electrodes 3a, 3b and 5a formed of good conductive material are provided to ensure electrical connection with the outside and to impart a desired voltage distribution to the resistance layer and the conductive layer. In some cases, these electrodes may be provided directly by an extension of the resistance layer or the conductive layer designated by 3 or 5, but if the terminal electrodes 3a, 3b and 5a were of high resistance value, the voltage applied to the layer 3 or 5 might be non-uniform depending on the points of connection between the electrodes and the outside and the area of contact therebetween and therefore, in such a case, different materials may be used for these electrodes so as to provide an intended voltage distribution.

In some other cases, a good conductive material may be treated in order to provide more complete lead wire connection and electrical contact. As such material, in addition to the above-mentioned materials forming the resistance and conductive layers, various metals such as Al, Ni, Cr, Au, Ag and Cu may be used individually or in the form of alloy or in lamination. Alternatively, the terminal electrodes 3a, 3b and 5a may be provided by a conductive paint, solder or conductive adhesive which may also serve as a lead wire connection.

A typical method of making the liquid crystal display cell used in the present invention comprises holding a resistance layer formed on a predetermined substrate and a conductive or a resistance layer formed in opposed relationship therewith with a predetermined thickness of spacer maintained between the two layers, pouring liquid crystal into a hermetically sealed clearance through an inlet port (exhaust port) by the utilization of pressure force, suction, capillary phenomenon or the like, and then closing and sealing the port.

The spacer may be a film of Mylar, polyester or one of other various materials, or uniformly shaped glass fiber or glass ball. Alternatively, the sealing agent itself may be used as the spacer to maintain the distance between the substrates (the thickness of the liquid crystal layer). As a further alternative, one of the glass substrates may be subjected to glass etching to provide a concave surface and thereby provide a predetermined thickness.

The sealing agent may be chosen from among organic adhesives, organic adhesive sheet, glass seal, using a glass flat, metallic seals such as glass solder and the like, because these are suitable in terms of intimacy of contact, air-tightness and reliability.

Alternatively, the entire liquid crystal display cell may be mold-sealed as by transparent plastics.

In the liquid crystal display cell of the field effect type, the molecules of liquid crystal must be in a predetermined molecular arrangement while, in the TN-FEM cell, the molecules of liquid crystal must be arranged in the boundary between the substrates with the major axis of the molecules being oriented parallel to the planes of the substrates and in one direction. Such arrangement may be accomplished by subjecting the surfaces of the substrates to a physical orientation process or a chemical orientation process or both.

Why and how the orientation occurs is still indefinite and cannot be explained in detail, but it is inferred that in fine grooves formed in a predetermined uniform direction on the surface contacted by the liquid crystal, the molecules of the liquid crystal are oriented in the direction of the grooves due to the elastokinetic behavior of the molecules to thereby induce the physical orientation. Thus, means for orienting the molecules of liquid crystal may be by imparting, in one direction, mechanical friction to the surface of the substrate contacted by the liquid crystal or by evaporating an orienting agent onto said surface in an oblique direction with respect thereto to thereby form grooves in a predetermined direction on said surface in accordance with the direction in which the crystal of the evaporated film grows. Such means may be borne directly by the resistance layer or the conductive layer, and also another orientation layer may be provided on these layers. It is also possible to form on the surface of the substrate a layer which permits said grooves to be formed with relatively great ease and form the grooves on that layer as by imparting friction to the surface thereof.

Chemically, a process in which a substance having a great affinity to the molecules of liquid crystal may be used to form an orientation layer on a substrate and friction is imparted to said layer to cause the molecules of liquid crystal to be naturally oriented on the surface contacted by the molecules.

Such an effect may be brought about by any of various interface activators, polymers, surface treating agents, etc. Further, for the purpose of uniformizing the twist between the opposed substrates, such auxiliary means may be provided as maintaining the angle of orientation between the opposed substrates less than 90° or controlling the thickness between the substrates and adding an optically active substance to the liquid crystal.

In case of the DAP-FEM cell, the molecules of liquid crystal must have their major axis oriented perpendicularly to the plane of the substrate. Such perpendicular orientation may be brought about by cleaning the surface of the substrate and subjecting it to acid or alkali treatment, or by evaporating a metal oxide onto the resistance layer or the conductive layer, or by applying an interface activator or other surface treating agent onto said layers, or by adding an orienting agent directly into the liquid crystal layer.

The liquid crystal display cell constructed in the manner as described above permits the polarizing plates, the diffusing plate, the filter and auxiliary means of illumination and lighting to be integrally fixed or adhered thereto or to be disposed in suitably scattered relationship in the light path.

Figure 9:
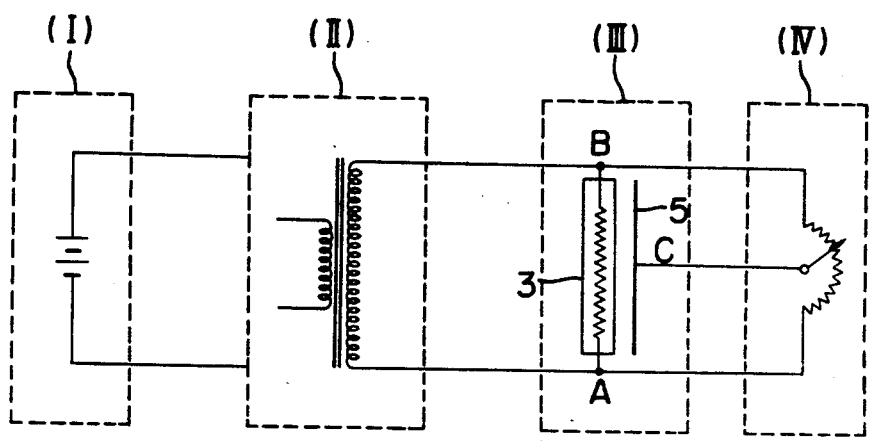
FIG. 9 is a block diagram showing a basic embodiment of the present invention.

The liquid crystal display cell (III) so far described in detail is connected to converting means (II) and control signal output means (IV), as shown in FIG. 9. The liquid crystal display cell (III) schematically shown in FIG. 9 is an example of the construction in which one of the layers provided on the opposed surfaces of two substrates is a conductive layer (designated by 5). The high voltage source section (II) serves to impart a suitable potential gradient to the resistance layer 3 of the liquid crystal display cell (III).

In FIG. 9, the power source (I) is shown as a battery, from which a DC voltage is supplied to the converting means (II) which converts the DC voltage into a voltage for operating the liquid crystal display cell (III).

The liquid crystal display device of the present invention will hereinafter be described in detail with respect to some specific embodiments thereof.

Figure 10:
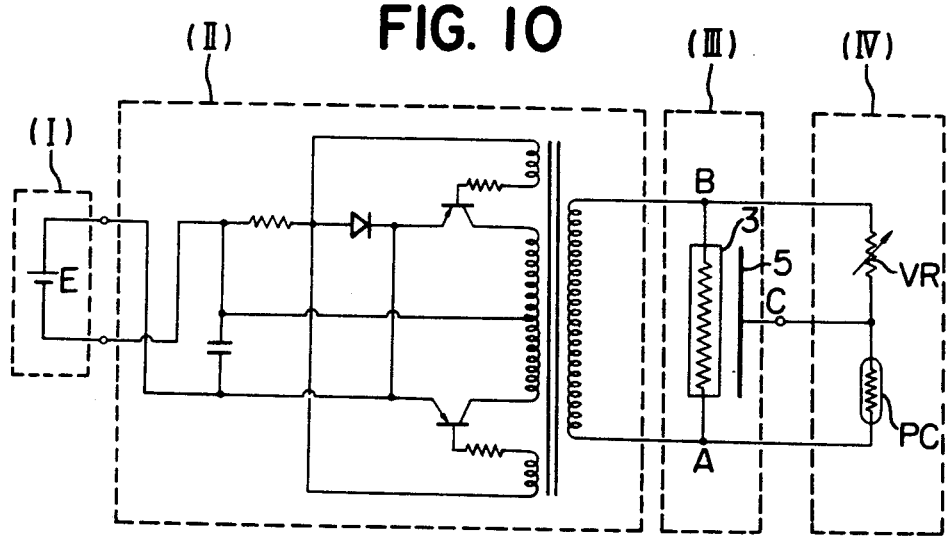
FIG. 10 is a circuit diagram showing a simplest embodiment of the present invention.

FIG. 10 is a circuit diagram showing a basic embodiment of the liquid crystal display device according to the present invention. In the Figure, (I) designates the power source section, (II) the converting circuit section, (III) the liquid crystal display cell and (IV) the control signal output circuit section.

In order that the display by the liquid crystal display cell (III) may be in the form of a thin band, as already noted, a higher voltage applied across the resistance layer 3 is more advantageous and therefore, in FIG. 10, the converting circuit section (III) is shown as a booster circuit such as a DC-AC inverter (synonymous with a transistor type inverter) for boosting the DC voltage E of the battery forming the power source section (I) to a high AC voltage. Briefly describing the performance of the booster circuit, the transistor type inverter shown there is basically an inverter using a vibrator and forms a circuit in which the saturation characteristic of the magnetic material of the transformer is utilized to maintain the switching operation of the transistor to thereby permit a desired voltage, for example, an AC voltage of square waveform having a desired frequency, to be derived from a particular DC voltage at the secondary winding side of the transformer. The performance of such circuit forms no essential part of the present invention and need not be described in detail.

In FIG. 10, a metering circuit is adopted as the control signal output circuit section (IV) and it comprises, for example, a variable resistor VR and a photoconductive element PC series-connected together as shown.

The AC voltage applied across the resistance layer 3 of the liquid crystal display cell (III) is also applied across the metering circuit, and the midpoint between the photoconductive element PC and the variable resistor VR is connected to the conductive layer 5 of the liquid crystal display cell (III) in the manner as shown.

By such connection, a suitable potential gradient may be imparted to the resistance layer of the liquid crystal display cell (III) and a potential in accordance with the intensity of light received by the photoconductive element PC in the metering circuit may be imparted to the conductive layer 5 opposed to the resistance layer 3. That is, the potential level of the conductive layer 5 is varied in accordance with the variation in the intensity of light received by the photoconductive element PC and thus, the metering value may be position-displayed in the form of a thin band on the display surface of the liquid crystal cell. Also, by varying the variable resistor VR in the metering circuit, the position whereat the display appears on the liquid crystal display cell (III) may be varied as desired and thus, by making logarithmic the variation in resistance value of the variable resistor VR with respect to the angle of rotation, the variable resistor VR may be used as photographing informaton in a camera, including film speed and shutter speed, and sometimes aperture information, open F-number information, etc. of the lens used. Further, if distribution of the resistance value of the resistance layer of the liquid crystal display cell (III) is made logarithmic and the potential gradient between A and B is also made logarithmic, the display by the liquid crystal display cell (III) may be made logarithmic.

Figure 11:
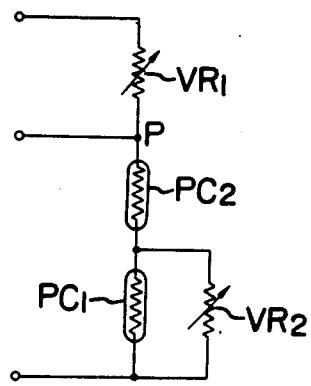
FIGS. 11(a) and (b) are circuit diagrams showing further embodiments of the metering circuit (IV) in FIG. 10 and FIGS. 11(c) and (d) are graphs illustrating the characteristics thereof.
Figure 11:
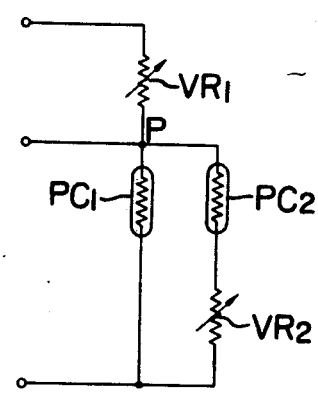
Figure 11:
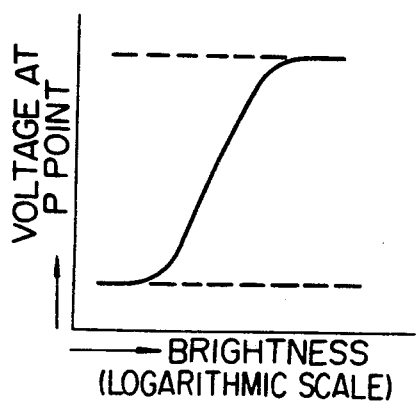
Figure 11:
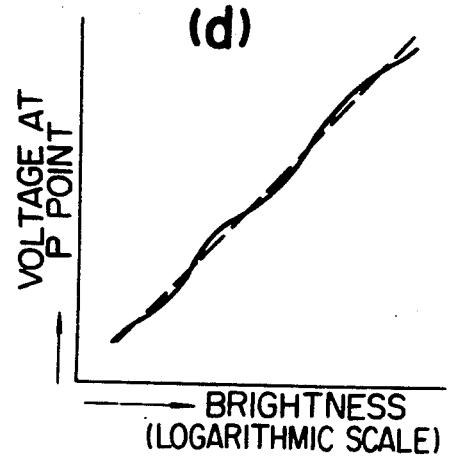

FIGS. 11(a), (b), (c) and (d) illustrate further embodiments of the metering circuit and the characteristic thereof.

The embodiment of FIG. 11(a) employs two photoconductive elements PC1 and PC2 which are series-connected together so that the voltage value at point P with respect to the logarithmic value of the light input may be linearly varied. A variable resistor VR2 is provided to compensate for the characteristic of the photoconductive element PC2 on that side thereof whereat the light input is lower in intensity.

FIG. 11(b) shows another embodiment which employs parallel-connected photoconductive elements PC1 and PC2 but achieves the same effect as that achieved by the embodiment of FIG. 11(a). The performance of the photoconductive elements PC1 and PC2 for brightness will now be described in greater detail. In FIG. 10, when the voltage is applied to the conductive layer 5 of the liquid crystal display cell (III), the output voltage at the dividing point between the photoconductive element PC and the variable resistor VR is varied linearly for a certain range of brightness, as illustrated in FIG. 11(c), because the resistance value of the photoconductive element PC is varied substantially linearly with respect to the logarithm of the brightness.

In order that such characteristic may be applied to a wide-band linear type exposure meter or camera, it is desirable that the linearity of the output voltage at said dividing point be further expanded.

For this purpose, a double photoconductive element such as that shown in FIG. 11(a) or (b) may be employed in a camera or the like. In FIG. 11(a) or (b), PC1 is the photoconductive element chiefly in charge of the high brightness range and PC2 is the photoconductive element chiefly in charge of the low brightness range. The use of these photoconductive elements may provide a linearly varying output voltage expanded as shown in FIG. 11(d). Usually, the resistance value of the photoconductive element PC1 is about ten times as great as that of the photoconductive element PC2.

Where such a double photoconductive element is used and the variable resistor VR1 in FIG. 11(a) or (b) is designed as a variable resistor whose resistance value is logarithmically variable with respect to the angle of rotation, the current flowing through the variable resistor VR1 is linearly varied with respect to the logarithm of the brightness and thus, by deriving a divisional output from the dividing point shown, it is possible to linearly set various values of photographing information such as film speed, shutter speed value, aperture vaue, etc. in accordance with the position of the dividing point.

Figure 12:
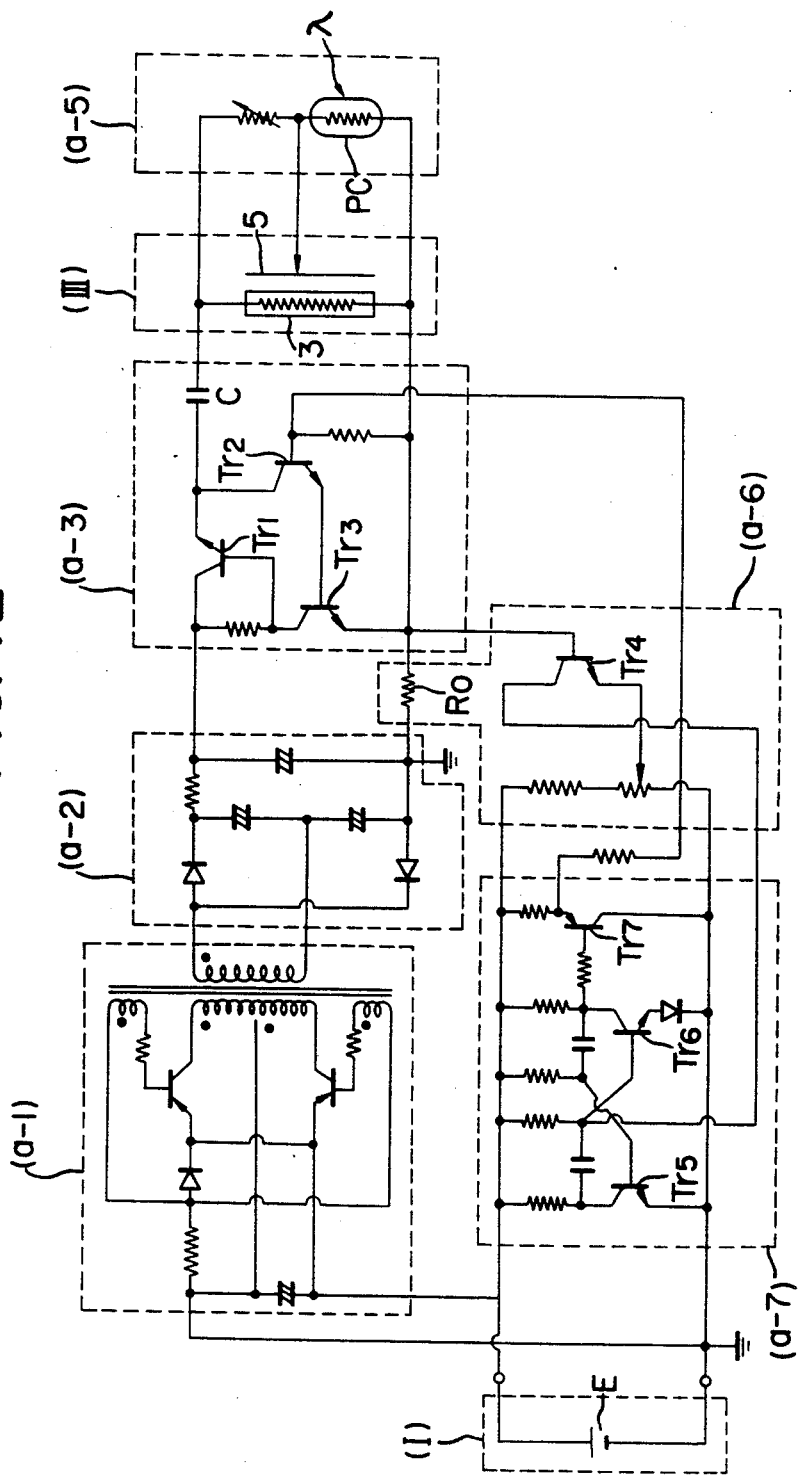
FIGS. 12 and 13 are circuit diagrams showing still further embodiments of the present invention.

FIG. 12 shows a modification of the FIG. 10 embodiment, in which the converting circuit section (II) comprises a boosting power source circuit (a-1), a commutating circuit (a-2), an interrupting circuit (a-3), a protective circuit (a-6) and a pulse oscillating circuit (a-7).

The liquid crystal display cell (III) has such physical properties that when the frequency of the AC voltage applied thereto is increased, it often becomes unable to effect display clearly in the form of a thin band because of, for example, slowed-down response speed of the liquid crystal itself. In such cases, therefore, it is necessary that the frequency of the AC voltage applied to the liquid crystal display cell (III) be reduced to a level below a particular frequency. This may effectively be realized by the embodiment of FIG. 12.

The boosting power source circuit (a-1) in FIG. 12 comprises an oscillator which effects oscillation, for example, at several hundred to several thousand Hz. For such oscillator, any oscillation frequency lower than 100 Hz is not practicable because it would require the core of the oscillation transformer to be super-sized or would increase the loss of power in transistors and core to thereby reduce the efficiency. Therefore, according to the present embodiment, as shown in FIG. 12, the boosting power source circuit (a-1) is designed to effect oscillation at a high frequency and the AC voltage at the secondary winding side of the oscillation transformer may be commutated and converted into a high DC voltage by the commutating circuit (a-2), which DC voltage may be ON-OFF-controlled by the signal from a low-frequency pulse oscillating circuit (a-7), whereby a low-frequency AC voltage may be provided intermittently.

In FIG. 12, the utilization of the commutating circuit (a-2) is highly advantageous in that it doubles and commutates the voltage at the secondary winding side of the oscillation transformer of the boosting power source circuit (a-1) to thereby minimize the number of turns of the secondary winding of such transformer and accordingly reduce the size of the transformer. The interrupting circuit (a-3) is intermittently driven by the signal from the low-frequency pulse oscillating circuit (a-7), which may comprise a transistor multivibrator or the like, to produce a low frequency AC voltage. In FIG. 12, the pulse oscillating circuit (a-7) is shown as a multivibrator, and transistors Tr2 and Tr3 are repeatedly turned on and off by the signal from such multivibrator. More specifically, when the transistor Tr3 is turned on, the transistor Tr1 is turned off and the emitter voltage of the transistor Tr1 becomes zero. When the transistor Tr3 is turned off, the transistor Tr1 is turned on and a predetermined voltage appears at the emitter of the transistor Tr1. Transistor Tr2 serves to cause the voltage stored in a capacitor C to be discharged, and the transistors Tr1 and Tr2 are alternately turned on and off, respectively, whereby a low frequency AC voltage may be provided at the output of the capacitor C. The protective circuit (a-6) is provided for the reasons set forth below. If the secondary winding or the load side of the oscillation transformer in the boosting power source circuit (a-1) is short-circuited or otherwise troubled to permit an excessive flow of current, the transistor Tr1 in the interrupting circuit (a-3) may suffer from a greater power loss which may lead to a damage of the transistor or an overcurrent may flow to the primary winding of the oscillation transformer to damage the switching transistor. It is therefore necessary to turn off the transistor Tr1 in the interrupting circuit (a-3) to nullify the voltage applied to the load side. The protective circuit (a-6), which is provided for such reason, has a function as will hereinafter be explained briefly. When an overcurrent detecting resistor Ro detects any current exceeding the normal level, a voltage drop occurs across this resistor Ro and the emitter voltage of transistor Tr4 which is set to a suitable level is exceeded by the base voltage thereof, so that the transistor Tr4 is turned on. As the result, the base voltage of transistor Tr6 in the pulse oscillating circuit (a-7) becomes substantially zero potential, thus turning off the transistor Tr4. By this, the pulse oscillating circuit (a-7) stops oscillation and transistor Tr7 is turned off, whereby the transistors Tr2 and Tr3 are held in ON state while the transistor Tr1 is turned off to nullify the output voltage, so that the entire circuit may be protected.

Figure 13:
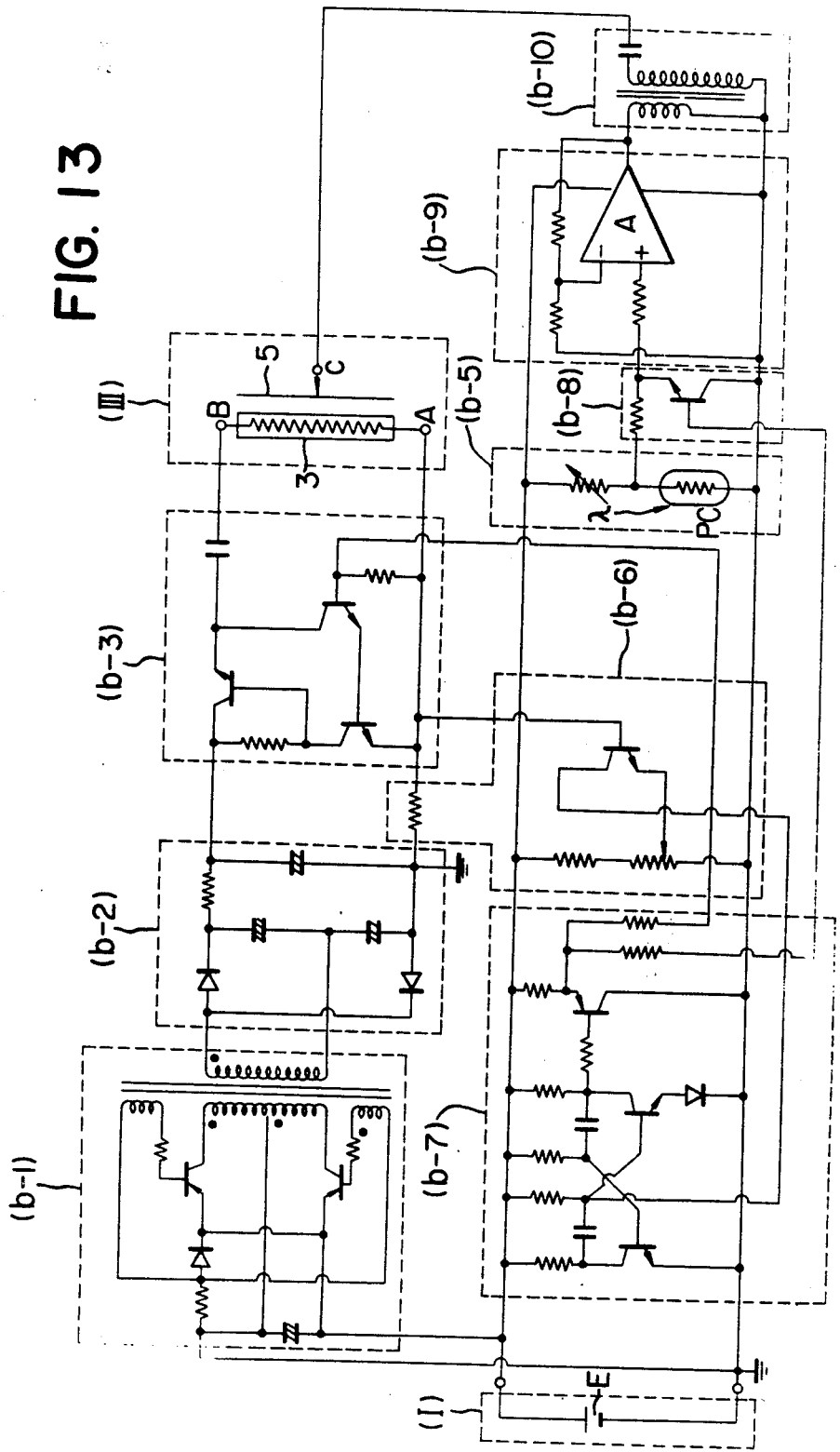

In FIG. 13, (III) is the liquid crystal display cell and (b-5) designates the metering circuit.

FIG. 13 shows a further embodiment of the present invention. In this Figure, sections (b-1) to (b-3), (b-5) to (b-7) and (III) correspond to the sections (a-1) to (a-3), (a-5) to (a-7) and (III) in FIG. 12. Designated by (b-8) is a metering signal interrupting circuit for converting the metering signal from the metering circuit (b-5) into an intermittent signal, and it effects synchronous control by the signal from the pulse oscillating circuit (b-7) which drives the interrupting circuit (b-3) of high voltage. Thus, at the output of the interrupting circuit (b-3), there is produced a pulse voltage whose amplitude is varied in accordance with that of the metering output of the metering circuit (b-5). Designated by (b-9) is a signal amplifying circuit for amplifying the aforementioned pulse voltage to a suitable amplitude and for applying the amplified voltage to a signal boosting circuit (b-10). This circuit comprises a signal transformer capable of passing therethrough signals of up to a sufficiently low frequency, and the maximum voltage value at the secondary winding side of the transformer is boosted to a voltage equal to the voltage applied to the resistance layer 3 of the liquid crystal display cell (III), and then applied to the conductive layer 5 of the liquid crystal display cell (III). This circuit has the following advantages: since the metering circuit (b-5) forms no load to the boosting power source circuit (b-1), as shown in FIG. 13, the transistor type inverter shown as an example of the boosting power source circuit (b-1) may be of a small capacity and accordingly, may be made extremely compact; and the voltage applied across the photoconductive element in the metering circuit (b-5) is so low that the photoconductive element need not be highly resistant to voltage.

Figure 14:
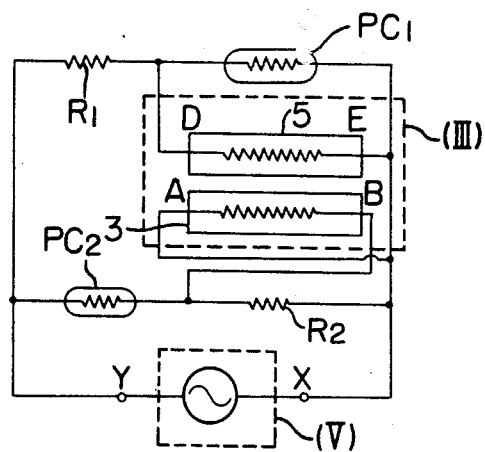
FIG. 14 is a schematic circuit diagram showing a further embodiment of the present invention.

FIG. 14 is a schematic circuit diagram showing still another embodiment of the liquid crystal display device according to the present invention. The liquid crystal display cell (III) in FIG. 14 is one in which the layer 5 in the liquid crystal display cell of FIG. 2 is also a resistance layer. Thus, this is a diagram of a basic circuit which employs a liquid crystal display cell having resistance layers on both of two substrates 2 and 6. The portion (V) encircled a dotted line is the power source section for the liquid crystal display cell (III). Resistors R1, R2 and photoconductive elements PC1, PC2 constitute a bridge circuit, by which the liquid crystal display cell (III) is driven.

Figure 15:
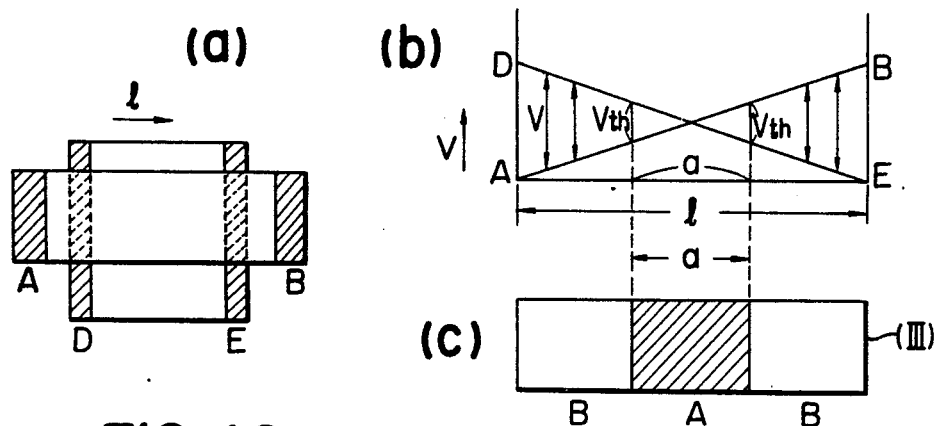
FIGS. 15(a), (b) and (c) illustrate the display principle of the liquid crystal display cell (III) used in the embodiment of FIG. 14.

In FIG. 14, when a voltage V1 is applied to a first resistance layer 3 and a voltage V2 to a second resistance layer 5, potential gradients as indicated by straight lines AB and DE in FIG. 15(b) will be produced on these resistance layers 3 and 5, respectively. Thus, the voltage V applied to the liquid crystal layer in a certain region of the entire display area 1 of the liquid crystal display cell (III) will be such as indicated by arrows between the straight lines AB and DE in FIG. 15(b) (the voltage V in each region is indicated by several arrows, but actually it is continuously varying within the area 1). Assuming that the threshold voltage of the liquid crystal display cell (III) is Vth, the liquid crystal in the region a where the voltage V is below Vth maintains the initial twisted orientation (the state prior to application of the voltage) while the liquid crystal layer beyond the region a changes from the initial twisted orientation to the isotropical state and therefore, if the directions of polarization of the two polarizing plates are perpendicular, the region a transmits the incident light therethrough and looks light but the regions other than a intercept the incident light and look dark. Thus, as shown in FIG. 15(c), a band-like light area (A) with the dark portion (B) as the background (hereinafter referred to as the display portion) may be seen on the display surface of the liquid crystal cell (III), Of course, the light-dark relationship in this instance will be reversed into negative-positive relationship if the directions of polarization of the two polarizing plates are parallel to each other.

The display portion (A) can be located with any desired band width at any desired position on the display surface of the liquid crystal display cell (III) by suitably varying the voltages applied to the resistance layers 3 and 5, but as the analog display such as position display or the like, the band width of the display portion (A) must be constant independently of the display position with the only exception that the band width may be varied if desired. In this sense, the voltages applied to the resistance layers 3 and 5 should preferably be set to satisfy and following relation:

$$V1 + V2 = \frac{2Vthl}{a} = \text{constant,}$$

where V1 is the voltage applied to the resistance layer 5, V2 the voltage applied to the resistance layer 3, 1 the width of the entire display area of the liquid crystal display cell (III) in FIG. 15(b), and a the display width of the display portion (A).

Thus, as will later be described, V1 and V2 are varied in an associated manner so that (V1 + V2) may be constant, by suitable control means.

In other words, if the midpoint in the display width a represents the display position of the display portion (A) and the opposite ends of the entire display area 1 of the liquid crystal display cell (III) are represented by A and B and the distance from the point A to said midpoint is m, then the following relation is established:

$$m = l - (\frac{a}{2Vth})V1 = (\frac{a}{2Vth})(\frac{2Vthl}{a} - V1) = (\frac{a}{2Vth})V2$$

It will thus be seen that the position of the display portion (A) is continuously displaceable with a constant width from one end A to the other end E of the entire display area 1 of the liquid crystal display cell (III).

Figure 16:
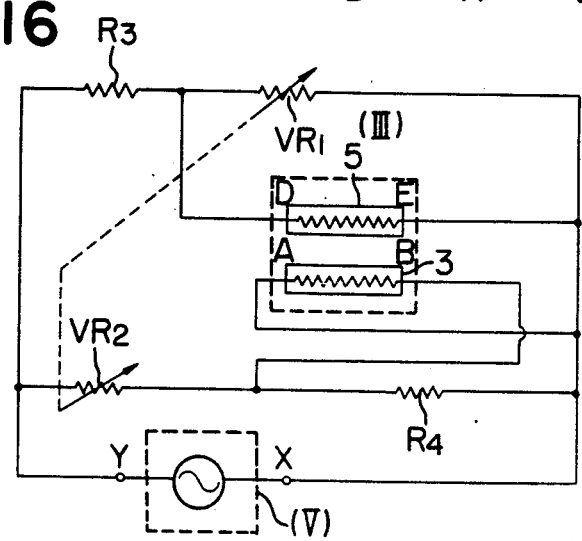
FIG. 16, 17, 19 and 20 are schematic circuit diagrams showing further embodiments of the present invention.

FIG. 16 diagrammatically shows a specific example of the circuit of varying V1 and V2 so tht (V1+V2) may be constant, by the use of two variable resistors VR1 and VR2 associated together.

If resistors R3 and R4 are equal in resistance value and variable resistors VR1 and VR2 are equal in resistance value, the voltage V generated by the power source section (V) is divided into V3 and V4 for R3 and VR1 and into V4 and V3 for R4 and VR2. Thus, the voltage V1 applied to the resistance layer 5 is equal to V4 and the voltage V2 applied to the resistance layer 3 is equal to V3, whereby (V1+V2) = (V4+V3)=V, which is thus constant. Such a device is applicable as a voltmeter, for example. However, it is to be understood that the resistance of the resistance layer 5 is greater than VR1 and the resistance of the resistance layer 3 is greater than R4.

Figure 17:
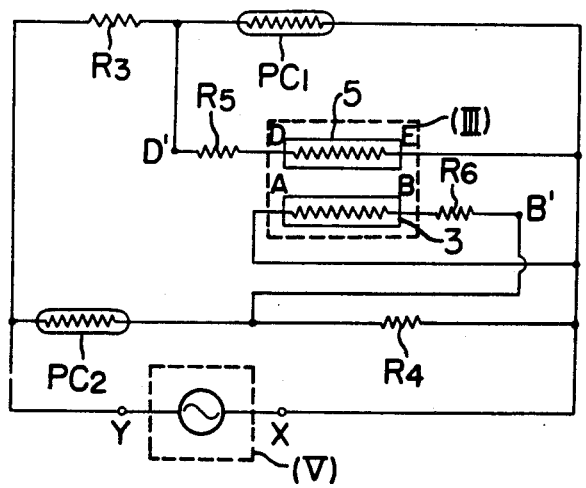

FIG. 17 shows a modification of the FIG. 14 embodiment in which a resistor R5 is inserted between points D and D' and a resistor R6 between points B and B'.

Figure 18:
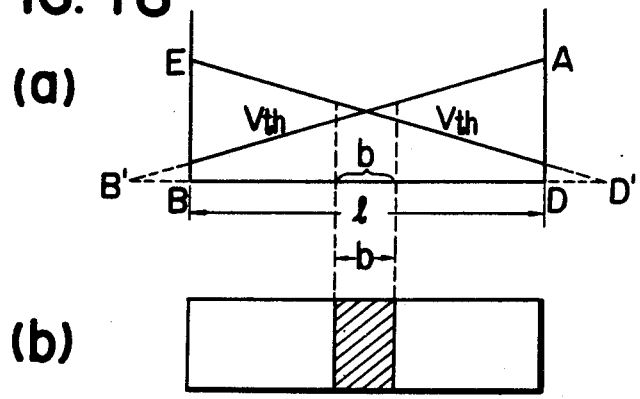
FIG. 18(a) and (b) are a schematic illustration of the FIG. 17 embodiment.

The gradients of the voltages applied to the resistance layers 3 and 5 in this instance, if expressed in the same manner as that shown in FIG. 15(b), will be such as shown in FIG. 18(a), the display width of the display portion is represented by b.

In the case of FIG. 17, as compared with the case of FIG. 14, the display portion (A) can be displaced from one end to the other end of the display area 1 of the liquid crystal display cell (III), as desired, without the potential at point A or E being relatively increased, and this facilitates to drive the liquid crystal display cell (III).

As described in connection with FIG. 16, in the liquid crystal display device shown in the circuit diagram of FIG. 17, the sum of the voltage V2 applied to the resistance layer 3 of the liquid crystal display cell (III) and the voltage V1 applied to the resistance layer 5 may be made constant by using photoconductive elements of equal characteristics (for eample, CdS cells) as the photoconductive elements PC1 and PC2.

A feature of the circuit shown in FIG. 17 is that since the resistances of the photoconductive elements PC1 and PC2 are not varied to zero, display can take place not all over the entire display area 1 of the liquid crystal display cell, whereas by inserting resistors R5 and R6 in the circuit as shown in FIG. 17, display can be accomplished throughout the entire display area 1 as illustrated in FIGS. 18(a) and (b).

Figure 19:
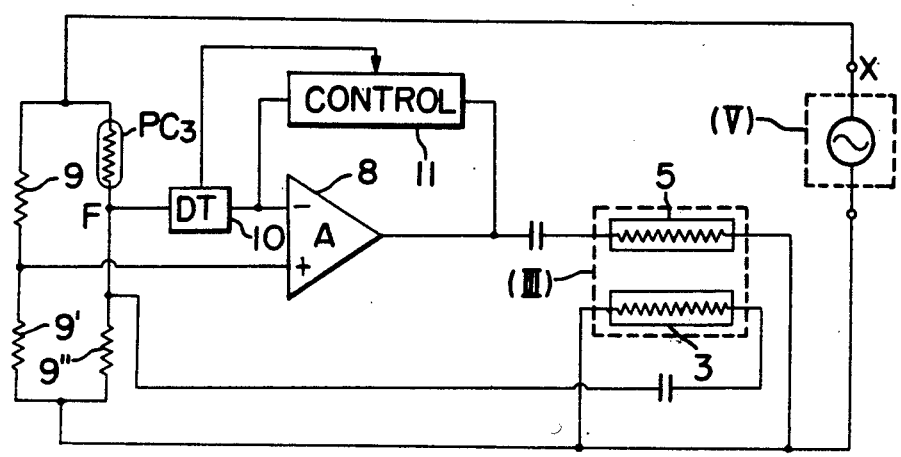
Figure 20:
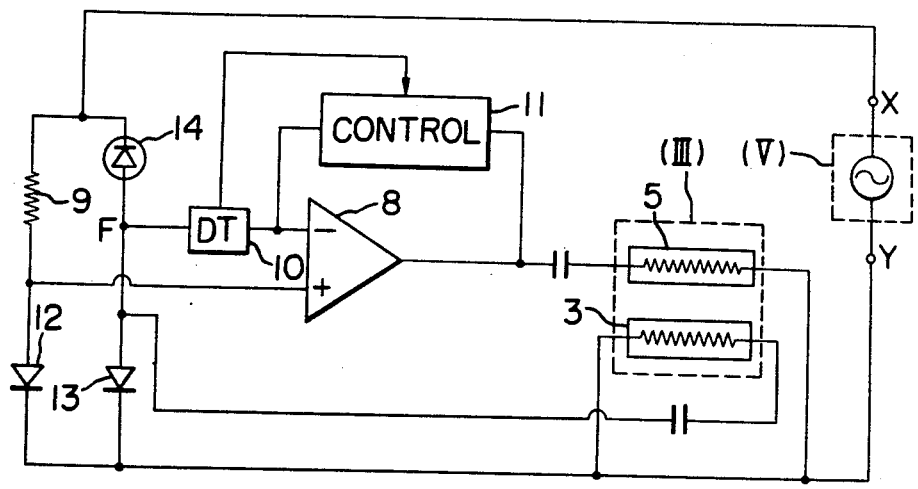

Further forms of the circuit for varying V1 and V2 so that their sum may be constant are shown in FIGS. 19 and 20.

In FIG. 17, it has been necessary to impart an equal quantity of light to the photoconductive elements PC1 and PC2 so that V1+V2) may be constant, whereas the example shown in FIG. 19 requires only one photoconductive element PC3 for operation. An amplifier 8 serves to provide, as reference voltage, the value of the voltage divided by resistors 9 and 9'. The photoconductive element PC3 is operable such that if the potential at point F is varied over $\Delta V_F$ with a variation in the quantity of light received, such variation in potential is detected by a detector 10 and transmitted to a feedback control section 11 so that the output voltage is varied over $-\Delta V_F$ by the amplifier 8. In this instance, the voltage applied to the resistance layer 5 is varied over $-\Delta V_F$ while the voltage applied to the resistance layer 3 is varied over $V_F$, thus satisfying the condition that (V1+V2) be constant.

The circuit shown in FIG. 20 is a partial modification of the circuit shown in FIG. 19. In FIG. 20, reference numeral 14 designates a silicon photocell (SPC), which differs from CdS cell is characteristic for light and is therefore connected to compressing diodes 12 and 13, instead of the resistors 9' and 9" in FIG. 19. The principle of operation of this embodiment is similar to that of the FIG. 19 embodiment.

Figure 21:
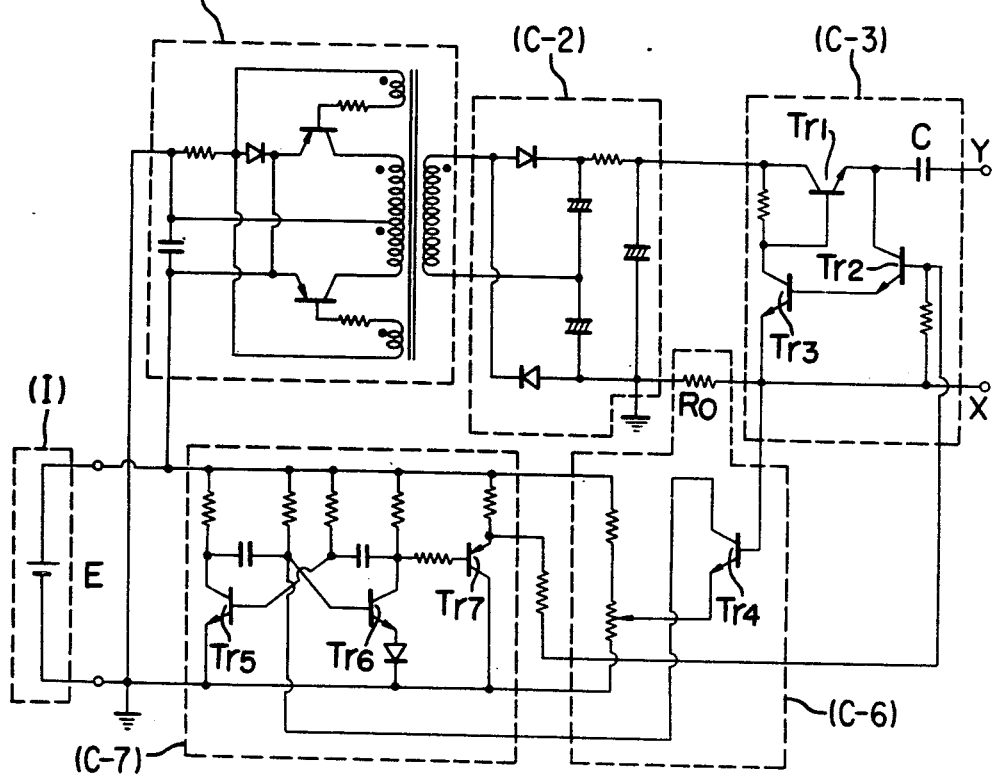
FIG. 21 is a circuit diagram showing a form of the power source section (V) forming the liquid crystal display device of the present invention.

FIG. 21 shows a form of the power source section (V) appearing in FIG. 14, 16, 17, 19 and 20. The power source section (V) comprises a boosting power source circuit (c-1), an integral circuit (c-2), an interrupting circuit (c-3), a protective circuit (c-6) and a pulse oscillating circuit (c-7). Points X and Y are connected to the points X and Y shown in said Figures. Operation of each circuit is similar to that described in connection with FIG. 12.

Description will now be made of a liquid crystal display device for realizing the liquid crystal display method which uses the liquid crystal display cell constructed as shown in FIG. 2 to alternately vary the potentials of the surfaces 3 and 5 in response to a plurality of different signal inputs, thereby enabling the liquid crystal display cell to provide a plurality of different display outputs.

Figure 22:
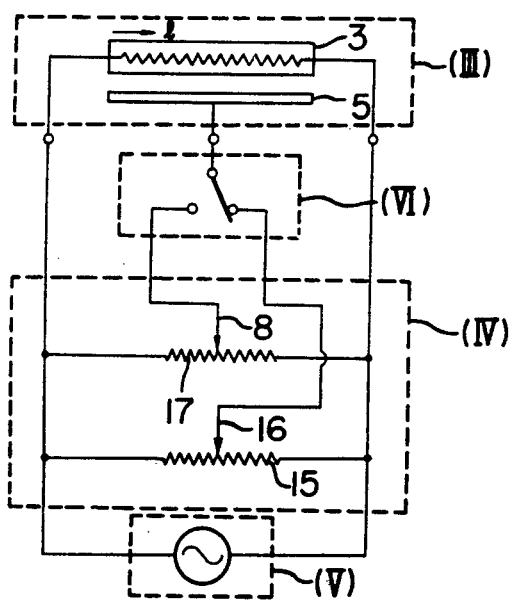
FIGS. 22, 23 and 25 are circuit diagrams showing further embodiments of the present invention.
Figure 23:
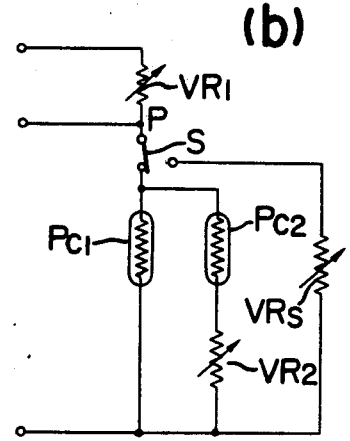
Figure 23:
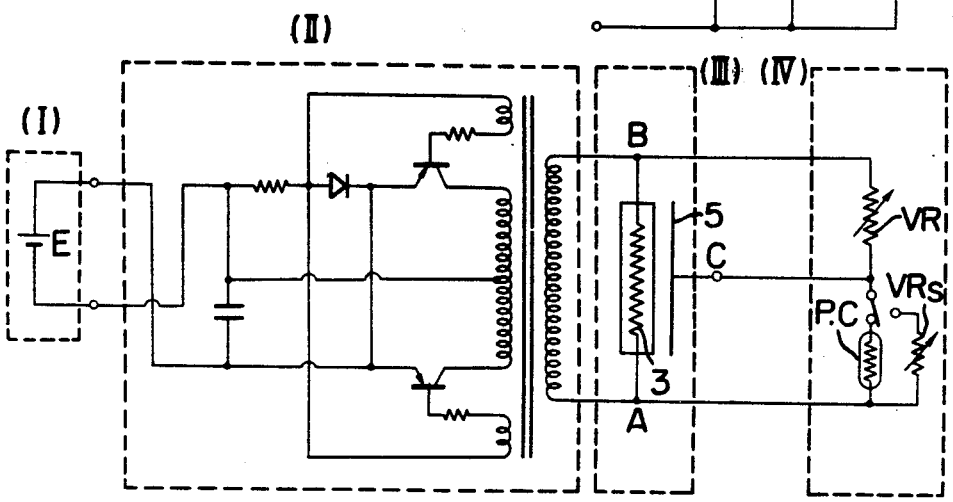
Figure 25:
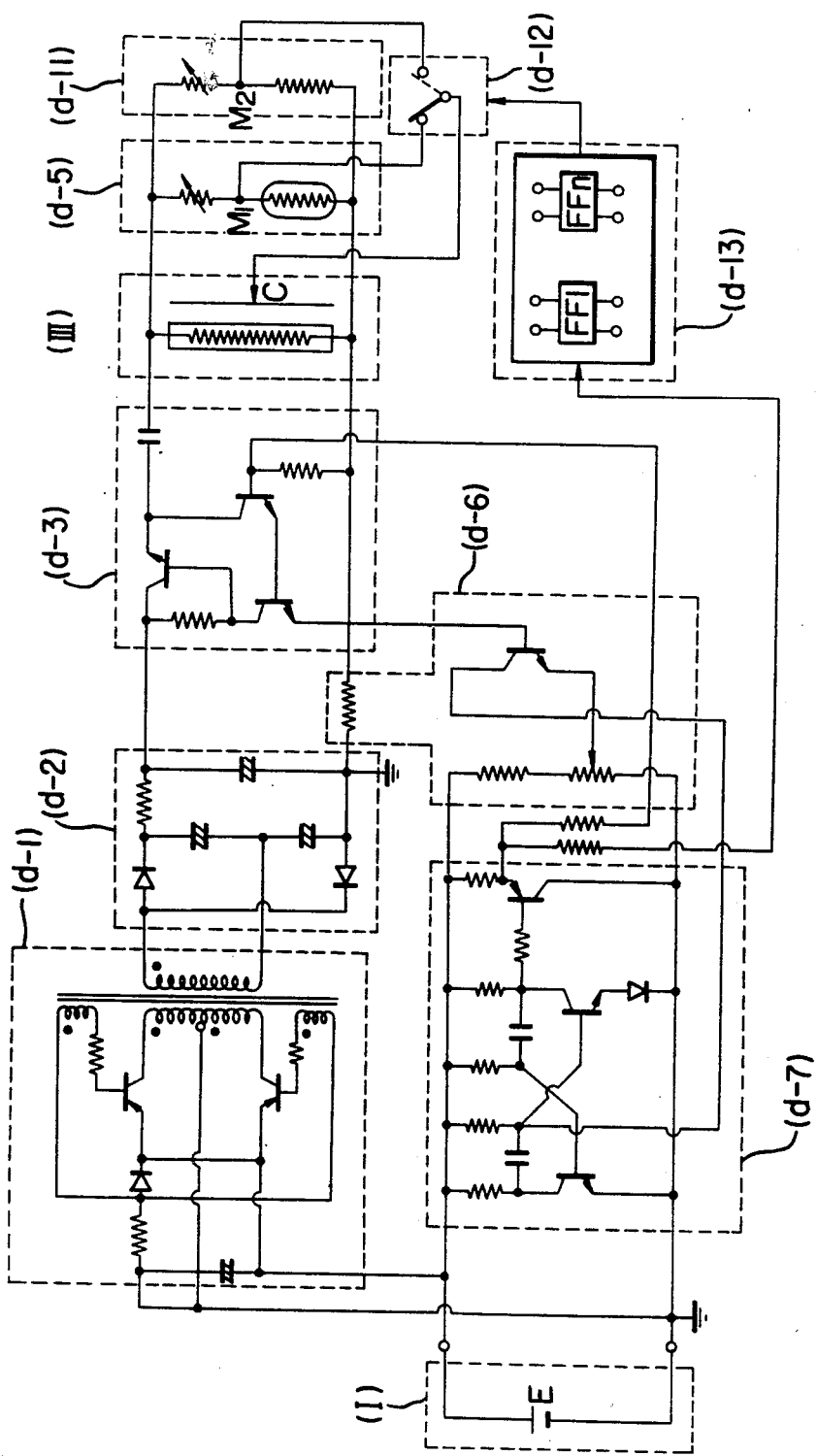

FIGS. 22, 23 and 25 are circuit diagrams showing some embodiments of such liquid crystal display device. In FIG. 22, the liquid crystal display device includes a liquid crystal display cell (III) only schematically shown, a control signal output circuit section (IV), a power source section (V) and a change-over circuit section (VI). If the conductive layer 5 is connected to the variable resistor 15 side by the change-over circuit section (VI), as shown, and if the potential of the conductive layer 5 as determined by the position of a brush 16 is $C_1C_1'$ as indicated in FIG. 8(a), then the display line as indicated in FIG. 8(b) will appear on the right-hand side of the display surface of the liquid crystal display cell (III). If, on the other hand, the change-over circuit section (VI) is connected to the variable resistor 17 side and if the potential of the conductive layer 5 as determined by the position of a brush 18 is $C_2C_2'$, as indicated in FIG. 8(a), then the display line will appear in the neighborhood of the center of the display surface of the liquid crystal display cell (III), as shown in FIG. 8(c). Further, if a third variable resistor is added to the control signal output circuit section (IV) and the conductive layer 5 is connected to the third variable resistor side by the change-over circuit section (VI) so that the potential of the conductive layer 5 may be $C_3C_3'$ as indicated in FIG. 8(a), then the display line will appear at the left-hand side of the liquid crystal display cell (III). Therefore, by successively changing over the voltage of the conductive layer 5 with the aid of the circuit as shown in FIG. 22, a plurality of display lines may be made to appear by a single liquid crystal display cell. If the change-over circuit (VI) is designed to be changed over not manually but automatically and at short time intervals, a plurality of display lines will be seen to appear apparently at a time on the display surface of a single liquid crystal display cell. Also, if at least one of the resistor brushes 16 and 18 in FIG. 22 is varied (they may be designed so as to automatically vary in accordance with the measurement value of some phenomenon) until they are coincident with each other, the plurality of display lines will become a single display lie (if $C_1C_1'$ and $C_3C_3'$ are coincident with $C_2C_2'$, there is provided a single display line), whereby it can be very clearly determined that the plurality of input signals to the liquid crystal display cell have become coincident. Even when two of three input signals have become coincident, the display lines change from three to two and this can be clearly determined. Thus, a plurality of information displays can be accomplished.

According to the display method described above, presence of coincidence between a plurality of input signals can be determined very easily and this will further be described. If the time interval of the change-over by the change-over circuit (VI) is long, a plurality of independent input signals will be seen as variations with time in display line by the viewer unless these input signals are coincident, and moreover, the amounts of disparity between the input signals may be seen from the amounts of variation at a glance. On the other hand, as the input signals approach the state of coincidence, the variation in position of the display line will become very slight and soon be seen as a single stationary display line. Thus, not only the presence of coincidence can be determined with great ease but also the amounts of disparity can be read intuitively. Where the time interval for the change-over by the change-over circuit (VI) is selected to a short one within the limit of the response speed of the liquid crystal, the optical modulation by the liquid crystal display cell will be incomplete so that the plurality of independent display lines will all look indefinite like the so-called half-lighting (or no-lighting). However, when the input signals become coincident, the voltage is repeatedly applied to the liquid crystal at the same location so that a definite single display line comes in sight. In this manner, presence of coincidence between the input signals can be very easily determined also by the apparent concentration (optical concentration) of the display line.

In FIG. 23, the converting means (II) is shown as a boosting circuit such as a DC-AC inverter (synonymous with transistor type inverter) for boosting the DC voltage E of the battery forming the power source section (I) to a suitable AC voltage, because a higher voltage applied across the reistance layer 3 is more advantageous to produce a thin band-like display on the liquid crystal display cell (III), as already noted.

In FIG. 23, a metering circuit is employed as the control signal output circuit section (IV) and it may comprise a variable resistor VR and a photoconductive element PC series-connected together as shown. The high AC voltage applied across the resistance layer 3 of the liquid crystal display cell (III) is also applied across the metering circuit. The midpoint between the photoconductive element PC and the variable resistor VR is connected to the conductive layer 5 of the liquid crystal display cell (III) in the manner as shown.

By such connection, a suitable potential gradient is imparted to the resitance layer 3 of the liquid crystal display cell (III) and since the photoconductive element PC in the metering circuit has its resistance varied in accordance with the intensity of light received, the variation in the intensity of light received is applied as a wide range of variation in potential level to the conductive layer 5 opposed to the resistance layer 3, whereby the metering value may be linearly displayed in the form of a thin band-like display. Also, by varying the variable resistor VR in the metering circuit, it is possible to change the display position of the liquid crystal display cell (III) as desired, and thus, by making logarithmic the variation in resistance value of the variable resistor VR with respect to the angle of rotation, such variable resistance may be used as, for example, photographing information in a camera including film speed and shutter speed, and sometimes aperture information of the lens used. Further, if distribution of the resistance value of the resistance layer 3 in the liquid crystal display cell (III) is made logarithmic and the potential gradient between A and B is also made logarithmic, the display by the liquid crystal display cell (III) may be made logarithmic. On the other hand, if a change-over switch S is changed over so that a variable resistor VRS variable in accordance with the set aperture information or the set shutter information is connected to the switch S by the photoconductive element PC, the potential at point C will be determined by the divided voltage of the resistors VR and VRS, whereby there may be provided a display line corresponding to the set value of the aperture or the shutter.

In the manner described, the display line provided by the photoconductive element PC and the display line provided by the variable resistor VRS are made coincident with each other, whereby a proper exposure may be obtained. It is to be noted that the metering circuit in FIG. 23 may be replaced by the metering circuit (b-5) shown in FIG. 13.

Figure 24:
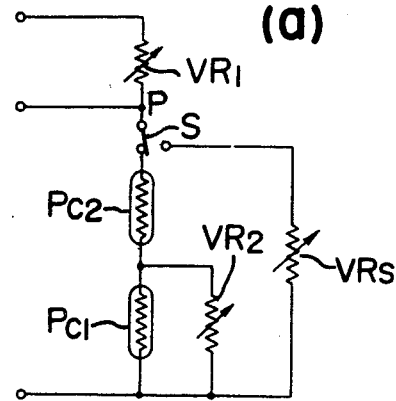
FIGS. 24(a) and (b) are circuit diagrams showing further forms of the metering circuit (IV) in the FIG. 23 embodiment.

FIGS. 24(a) and (b) show further forms of the metering circuit in FIG. 23. In FIG. 24(), a photoconductive elements PC1 and PC2 are series-connected together so that the voltage value at point P with respect to the logarithmic value of the light input may be linearly varied. Variable resistor VR2 serves to compensate for the characteristic of the photoconductive element PC2 on that side thereof whereat the light input is lower in intensity.

In the embodiment of FIG. 24(b), the photoconductive elements PC1 and PC2 are parallel-connected together to achieve substantially the same object and effect as the embodiment of FIG. 24(a).

FIG. 25 shows a further embodiment of the present invention. In this embodiment the converting circuit section (II) comprises a boosting power source circuit (d-1), a commutating circuit (d-2), an interrupting circuit (d-3), a protective circuit (d-6) and a pulse oscillating circuit (d-7), and the control signal output circuit section (IV) comprises a metering circuit (d-5), an information setting circuit (d-11), a change-over switch circuit (d-12) and a frequency dividing circuit (d-13). In FIG. 25, the reference characters (d-1), (d-2), (d-3), (d-5), (d-6), (d-7) and (III) correspond to the reference characters (a-1), (a-2), (a-3), (a-5), (a-6), (a-7) and (III) in FIG. 12. The information setting circuit (d-11) serves to set various values of photographing information such as film speed, shutter speed, aperture size, etc. in camera photography. The frequency dividing circuit (d-13) may comprise flip-flops for converting the period of the repetitive pulse of the pulse oscillating circuit (d-7) into a suitable period. The change-over switch (d-12) serves to alternately change over the outputs of the metering circuit (d-5) and the information setting circuit (d-11) and apply such outputs to the conductive layer 5 of the liquid crystal display cell (III).

Description will hereinafter be made of the display performance of the liquid crystal display cell (III) using the control signal output circuit section (IV) constructed as described.

The period of the frequency dividing circuit (d-13) for driving the change-over switch (d-12) is set so as to be sufficiently longer than the repetitive period of the pulse oscillating circuit (d-7). If the potential at point M1 in the metering circuit (d-5) and the potential at point M2 in the information setting circuit (d-11) are in advance made to differ from each other, and by suitably setting the change-over period of the change-over switch (d-12), the display effected by the liquid crystal display cell (III) may be made into two thin bands having a certain distance therebetween. Now, set the potential at the point M2 in the information setting circuit (d-11) to a suitable level, and let the value displayed by the liquid crystal display cell (III) which corresponds to said voltage be the proper exposure value in camera photography. Then, the operation of nullifying the difference between said output and the displayed value corresponding to the output potential of the metering circuit (d-5) until the two outputs become coincident is often used (needle follow-up operation), whereas in this instance, it is only required to bring the output voltage of the metering circuit (d-5) into coincidence with the output voltage of the information setting circuit (d-11). Thus, such purpose may be achieved by adjusting the intensity of light incident on the photoconductive element in the metering circuit (d-5) with the aid of, for example, an aperture mechanism or the like. Further, with such a method, it is possible to know the photographing information either by the point whereat the two outputs have become coincident as described, or by the displacement of the display position on the liquid crystal display cell (III). Also, if the switching speed of the change-over switch (d-12) is preset to the fast and when there is a difference between the output voltages of the two circuits, the display at the point of time whereat the output voltages of the two circuits become coincident may be effected by utilization of the delay in response of the liquid crystal display cell (III).

Figure 26:
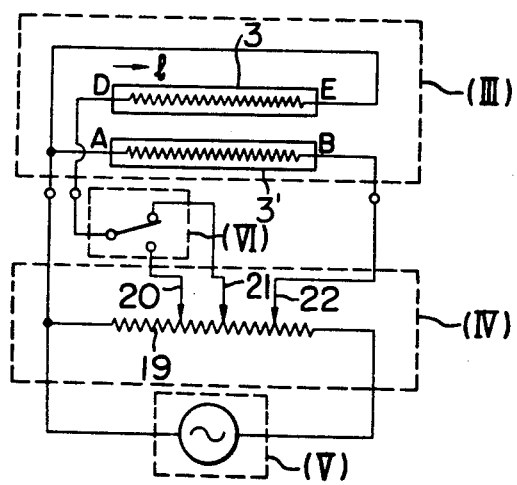
FIG. 26 is a schematic circuit diagram showing an embodiment of the liquid crystal display device according to the present invention which can perform a plurality of information displays.
Figure 27:
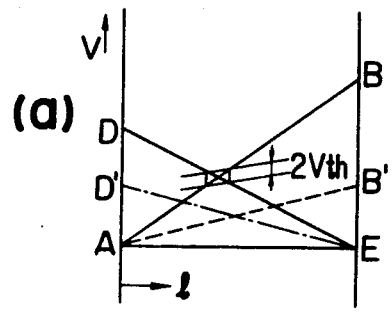
FIGS. 27(a), (b) and (c) schematically illustrate the display principle in FIG. 26.
Figure 27:
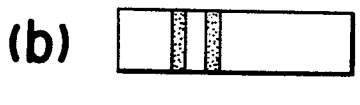
Figure 27:
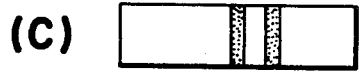

Reference will now be had to FIGS. 26 and 27 to describe another embodiment for effecting a plurality of information displays. In this embodiment, unlike the embodiment of FIG. 25, the liquid crystal display cell (III) comprises a resistance layer 3 and a second resistance layer 3' corresponding thereto, and the control signal output circuit section (IV) comprises a variable resistor 19 and brushes 20, 21, 22. Designated by (V) is the power source section which may comprise, for example, the circuit as shown in FIG. 21.

With such construction, the resistance layer 3' may be provided with a potential gradient as indicated by straight line AB in FIG. 27(a) in accordance with its own resistance characteristic and the position of the brush 22 while the other resistance layer 3 may be provided with a potential gradient as indicated by straight line ED or ED' in accordance with its own resistance characteristic and the position of the brush 21 or 20. Thus, upon change-over by the change-over circuit (VI), display lines will appear on the liquid crystal display cell (III) alternately at a position corresponding to the intersection between straight lines AB and ED and at a position corresponding to the intersection between straight lines AB and ED', as shown in FIG. 27(b). Also, if the position of a brush is changed (the brush 22 is leftwardly moved in FIG. 26), a potential gradient as indicated by straight line AB' in FIG. 27(a) is imparted to the resistance layer 3' so that the position of the two display lines are rightwardly displaced as shown in FIG. 27(c). In this manner, the two electrodes of the display cell are formed by resistance layers and different independent input signals are applied to these electrodes, whereby a plurality of display lines may appear and enable the amount of disparity and presence of coincidence between the input signals to be seen. The resistance characteristics of the resistance layers 3 and 3' may also be non-linear, in which case the potential gradients produced in the resistance layers 3 and 3' will be non-linear accordingly.

Figure 28:
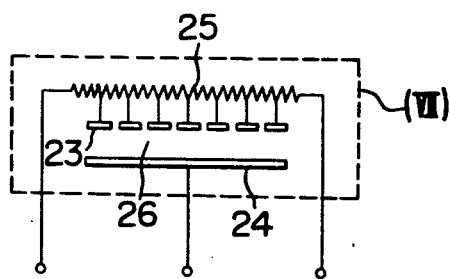
FIG. 28 to 31 are schematic views of further liquid crystal display cells used in the present invention.
Figure 29:
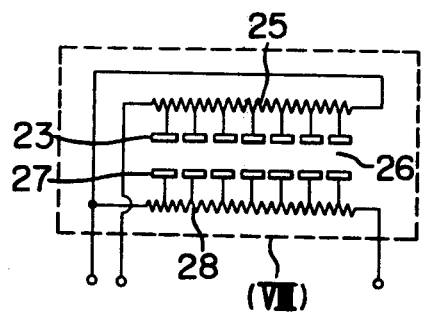

Next, reference will be had to FIGS. 28 and 29 to describe modified forms of the liquid crystal display cell usable with the present invention.

In the embodiments already described, each of the layers 3 and 5 forming the electrodes of the liquid crystal display cell has been continuous, whereas in the liquid crystal display cell (VII) schematically shown in FIG. 28, the electrode 23 provided on one of substrates is formed by finely divided conductive layers and these finely divided conductive electrodes (conductive layers) are connected together by a resistor 25, whereby a potential may be imparted to these finely divided electrodes at their respective positions. The opposed electrode 24 provided on the other substrate is a continuous, conductive electrode (conductive layer).

In the liquid crystal display cell (VIII) shown in FIG. 29, the opposed electrode 27 is finely divided like the electrode 23, and the finely divided electrodes are electrically connected together by a resistor 28 as is the electrode 23. In FIGS. 28 and 29, the resistors 25 and 28, with the fine electrodes 23 and 27, may be respectively formed on the common substrates (2 and 6 in FIG. 2).

When driven, the liquid crystal display cells (VII) and (VIII) shown in FIGS. 28 and 29 may take the place of the aforesaid liquid crystal display cell (III). In such cases, the input signals are continuous analog signals but the display will be in a digital form wherein the position of the display line is stepwisely displaced in accordance with the positions of the respective electrodes. The clearance 26 is filled with liquid crystal.

Figure 30:
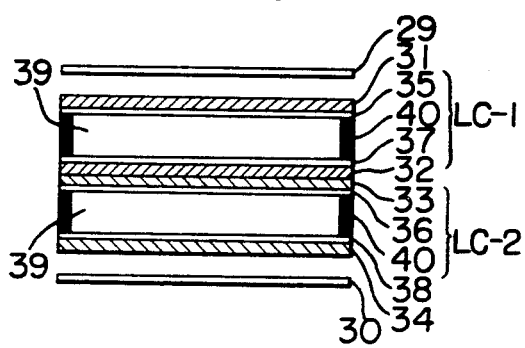
Figure 31:
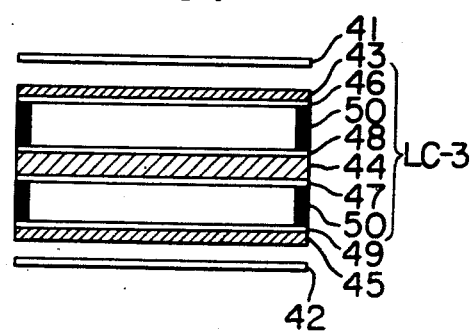

A plurality of information displays may also be accomplished by using further forms of the liquid crystal display cell as illustrated in FIGS. 30 and 31.

FIG. 30 shows a form in which two unitary liquid crystal cells LC-1 and LC-2 are superposed one upon the other and disposed between two polarizing plates 29 and 30. This form of the liquid crystal display cell further includes transparent substrates 31, 32 for the first liquid crystal cell LC-1, transparent substrates 33, 34 for the second liquid crystal cell LC-2, transparent resistance layers 35, 36, transparent conductive or resistance layers 37, 38, liquid crystal layers 39 and spacers 40.

FIG. 31 shows a form in which a single unitary liquid crystal cell LC-3 having two layers of liquid crystal is disposed between two polarizing plates 41 and 42. This form of the liquid crystal display cell further includes transparent substrates 43, 44, 45, transparent resistance layers 46, 47, transparent conductive or resistance layers 48, 49, spacers 50 and liquid crystal layers 51.

The principle of the display effected by the use of the liquid crystal display cell shown in FIG. 30 or 31 will be described by reference to FIGS. 32(a), (b), (a') and (b'). In these Figures, LC-1 denotes the first liquid crystal cell, LC-2 the second liquid crystal cell, and 29 and 30 represent the polarizing plates.

Figure 32:
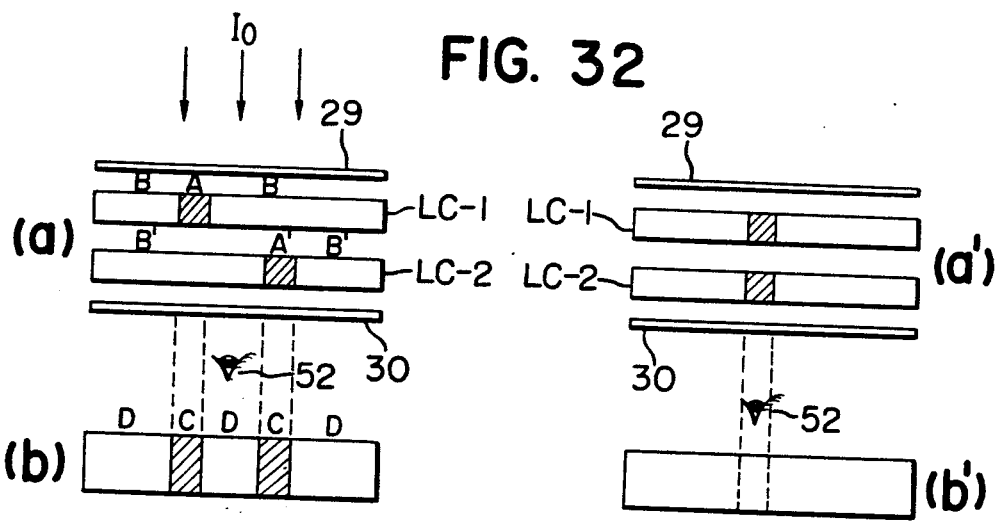
FIGS. 32(a), (a'), (b) and (b') and FIGS. 33(a) and (b) schematically illustrate the display principle of the liquid crystal display cells shown in FIGS. 30 and 31.

In FIG. 32, shaded portions (A) and (A') are the display portions of the first and second liquid crystal cells, respectively, and unshaded portions (B) and (B') are the non-display portions of the first and second liquid crystal cells, respectively. Describing the display condition recognized by the viewer 52 when the planes of polarization of the polarizing plates 29 and 30 are parallel, a voltage exceeding the electro-optical threshold voltage of the liquid crystal is being applied to the non-display portions (B) and (B') (ON state). Therefore, the liquid crystal layer in these portions is isotropic and has no rotatory power so that in the portions of the liquid crystal cells LC-1, LC-2 where the non-display portions (B) and (B') overlap each other, that part of the incident light Io which has been transmitted through the polarizing plate 29 directly reaches the polarizing plate 30. On the other hand, in the display portions (A) and (A'), there is being applied a voltage below the threshold voltage (OFF state) so that the liquid crystal in these portions is in 90° twisted orientation and acts to rotate the transmitted light through 90° and, thus, that part of the incident light Io which has been transmitted through the polarizing plate 29 is rotated through 90° when passing through these portions, and then reaches the polarizing plate 30.

As a result, where the planes of polarization of the polarizing plates 29 and 30 are parallel, the viewer 52 in front of the cell can recognize the display provided by the light portion (D) and the dark portion (C) as shown in FIG. 32(b). In the present invention, information-carrying electrical signals can be individually applied to the liquid crystal cells LC-1 and LC-2 so that a plurality of information signals can be displayed at a time (in FIGS. 32(b), two dark portions (C) are displaying two dependent types of information).

Reference will now be had to FIGS. 32(a') and (b') to explain the display condition wherein the display portion of at least one of the liquid crystal cells LC-1 and LC-2 has been displaced by the voltage applied to the cell until the display portions (A) and (A') have completely overlapped.

That part of the light transmitted through the polarizing plate 29 which has further been transmitted through the overlapped areas of the non-display portions (B) and (B') is rotated through 90° by the non-display portion (B) of the liquid crystal cell LC-1 and is further rotated through 90° by the nondisplay portion (B') of the liquid crystal cell LC-1, and then reaches the polarizing plate 30. Such light is just in the state (the same plane of polarization) as the light transmitted through the areas in which the display portions (A) and (A') are overlapped, so that the viewer 52 can see the entire area in its light state with the dark completely eliminated, as shown in FIG. 32(b'). Thus, the viewer can recognize the display signifying coincidence between a plurality of independent information signals, and this is a very unique display method which will find wide applications in various fields of art, for example, photographing information in cameras, tuning of radio and television sets, and common measurements of distance, weight, etc.

This display method will be particularly effective where absence of display is rather preferred once the measurement value has coincided with the reference value to attain a certain set condition.

The embodiment of FIG. 32 has been described with respect to the case where the planes of polarization of the polarizing plates 29 and 30 are parallel, but if they are orthogonal, it will be obvious that the light and the dark portions will only be reverse to each other without any change in the other points.

Also, in FIG. 32, two layers of liquid crystal have been shown, whereas a construction having three or more layers of liquid crystal could be explained likewise.

Figure 33:
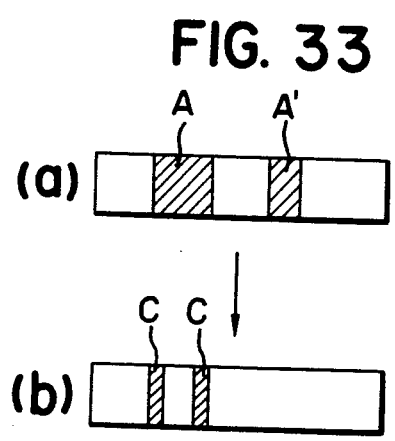

Further, in FIG. 32, the display portions (shaded portions) of the liquid crystal cells have been shown as having equal widths, whereas FIG. 33 shows the principle of display for the case where the display portions of the liquid crystal cells differ in width.

FIG. 33(a) refers to the display condition as seen by the viewer when the display portions of the liquid crystal cells are not overlapped, in which case (A) and (A') are recognized as respective information display outputs. Whenever at least one of the display portions has been displaced to bring about overlap between the display portions, the display condition as shown in FIG. 33(b) may be recognized by the viewer, as will be readily apparent from what has already been described in connection with FIG. 32.

The display method of FIG. 33 will be convenient, for example, in the case where the display portion (A) is directed to the display of a reference value having a certain range and the display portion (A') is set within (A). In such case, it will suffice to control (A) or (A') so as to ensure the two shaded portions (C) as seen in FIG. 33(b) to be always present.

Figure 34:
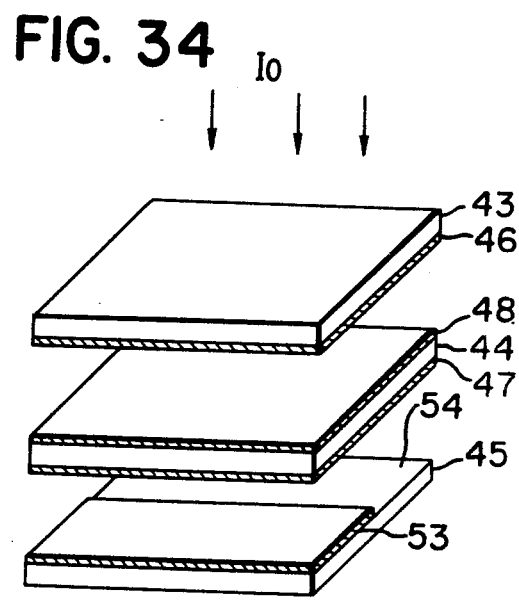
FIG. 34 is a schematic view of a further form of the liquid crystal display cell used in the present invention.
Figure 35:
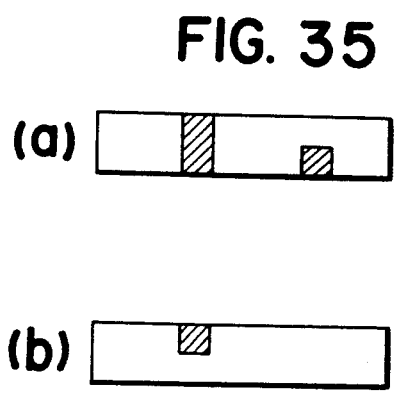
FIGS. 35(a) and (b) illustrate the displays effected by the liquid crystal display cell of FIG. 34.

FIG. 34 shows a further form of the liquid crystal cell for effecting a plurality of information displays which has two layers of liquid crystal. In the form shown in FIG. 34, which is a modification of the liquid crystal cell LC-3 illustrated in FIG. 31, one of resistance layers 47 is provided on a portion of the substrate 45, as indicated at 53. Other reference numerals are similar in significance to those in FIG. 31. The display mode effected by the liquid crystal cell of FIG. 34 is such as shown in FIG. 35(a). If the display portions are overlapped to each other, as in FIG. 32(a'), such display will change to the mode as shown in FIG. 35(b), wherein only a part of the display has been eliminated. In this case, that portion of the liquid crystal layer which is sandwiched between the portion 54 of the substrate 45 provided with no resistance layer and the transparent resistant layer 47 is in the state of having no rotatory power.

Figure 36:
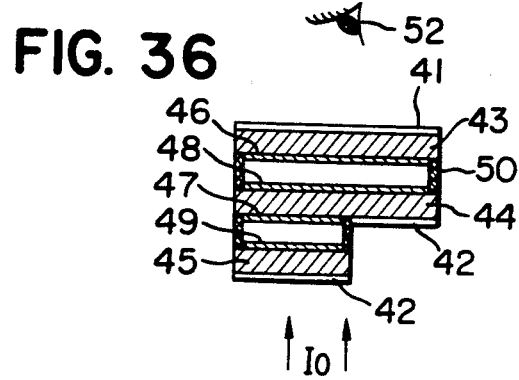
FIG. 36 is a schematic cross section of FIG. 34.

Of course, it would be sufficient for the transparent resistance layer 47 on the substrate 44 opposed to the substrate 45 to occupy only the area corresponding to the conductive layer 53, and the substrate 45 could also unobjectionably be designed to occupy only the area corresponding to the conductive layer. A schematic cross-section of such construction is shown in FIG. 36.

Some examples of the driving circuit for driving the above-described liquid crystal display cell having two layers of liquid crystal will now be shown.

Figure 37:
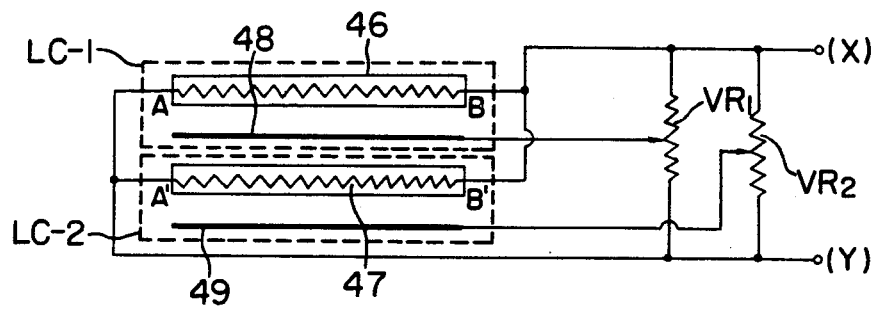
FIGS. 37 and 38 diagrammatically show part of the basic circuit when it is driving the liquid crystal display cell of FIG. 30, 31, 34 or 36.

In FIG. 37, the first LC-1 and the second liquid crystal cell LC-2 are indicated by dotted frames, respectively, and layers 46 and 47 are transparent resistance layers while layers 48 and 49 are transparent conductive layers. The potential gradients AB and A'B' of the transparent resistance layers 46 and 47 are equal because the cells LC-1 and LC-2 are connected to a common power source at X and Y.

Since the potential levels of the conductive layers 48 and 49 can be individually varied by variable resistors VR1 and VR2, respectively, one of these conductive layers may be used as the input for set value signal while the other conductive layer may be used as the input of operating value signal which is to be adjusted to the set value signal.

Figure 38:
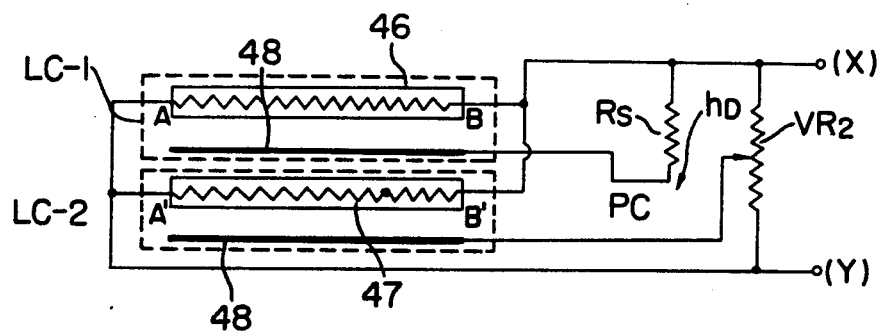

FIG. 38 shows the case where photoconductive element PC is used to correspond to the set value of the cell LC-1 and the set value is determined by the quantity of extraneous light received.

These driving circuits are only illustrative of the principle which enables the basic performance of the present invention, and they permit various modifications for actual use. For example, the respective electric circuits may be provided independently of one another, different potential gradients may be imparted to the resistance layers of the cells LC-1 and LC-2, the input operation for the set value signal or the operating value signal may be operatively associated with other operating portions of the instrument, and these input signals may be the result of the operation necessary to the performance of the instrument.

Figure 39:
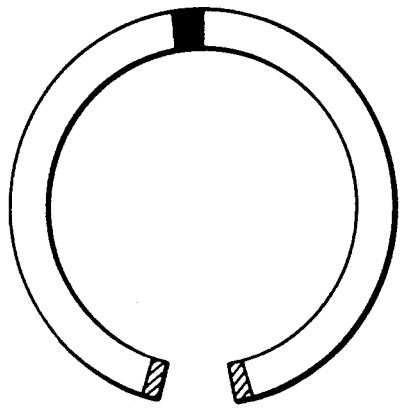
FIGS. 39(a), (b), (c), (d), (e) and (f) show various forms of the display effected by the liquid crystal display cell used in the present invention.
Figure 39:
Figure 39:
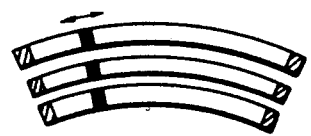
Figure 39:
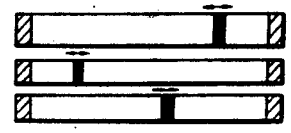
Figure 39:
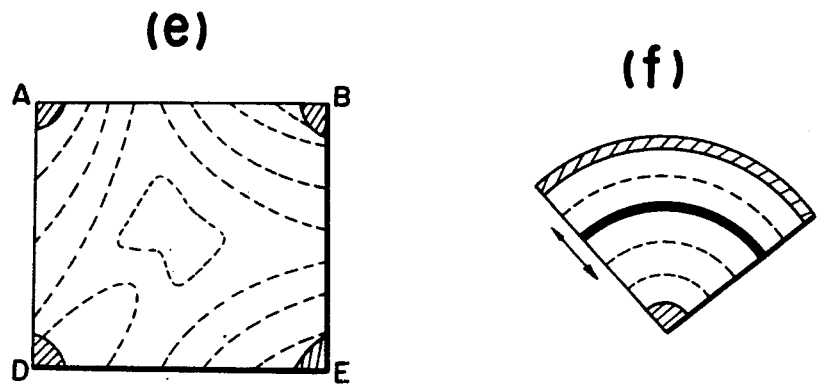

Modifications of the display mode of the liquid crystal display cell used in the present invention will now be illustrated. FIG. 39(a) shows an example in which the resistance layer to be provied is not disposed rectilinearly on the substrate but formed in a ring-like shape. The blackened portion is the display portion and the shaded portions denote the terminal electrode portions. Such denotation will also hold true hereinafter. FIG. 39(b) is an example in which the terminal electrode portions are disposed with non-uniform interval therebetween so that the potential gradient may be vertically non-uniform. FIG. 39(c) shows an example in which a number of resistance layers are arrayed in a partial sector so that the length of the needle display may be apparently extended and that the display may look as if a meter display. The examples shown in FIGS. 39(a) and (c) are analogous to the conventional meter display. If the form of FIG. 39(c) is modified into a generally sector-shaped design, the electric line of force will follow the shortest path so that the display will be similar to that shown in FIG. 39(b). The display shown in FIG. 39(b) gives an impression that the end of the needle display is sharp and this will assist in accurately reading the position. The form of FIG. 39(b) may be variously modified in the shape of the terminal electrode portions, but it would involve much redundancy in design. FIG. 39(d) shows an example in which a number of bar-like display portions are arrayed and different potential gradients are imparted to the respective resistance layers. This example may suggest a modification in which display of particular functions may be accomplished by a different potential level being imparted to the conductive layer opposed to each resistance layer. While the examples shown in FIGS. 39(a) to (d) are those in which display is effected by the positions on straight lines or curved lines, FIG. 39(e) shows an example in which terminal electrode portions A, B, D and E are disposed in the four corners of a planar resistance layer and different potentials are imparted to the respective terminal electrode portions, the result of which is shown by the equipotential lines indicated by dotted lines. This may be effectively utilized to observe the balance between a plurality of potentials with the aid of variations in the pattern within the plane or the correlations between various phenomena which vary with time or differ in dimension. FIG. 39(f) shows a further example in which electrode portions are provided along the middle and the circumference of a sector so that displays having various radii may appear on concentric circles, as desired.

Figure 40:
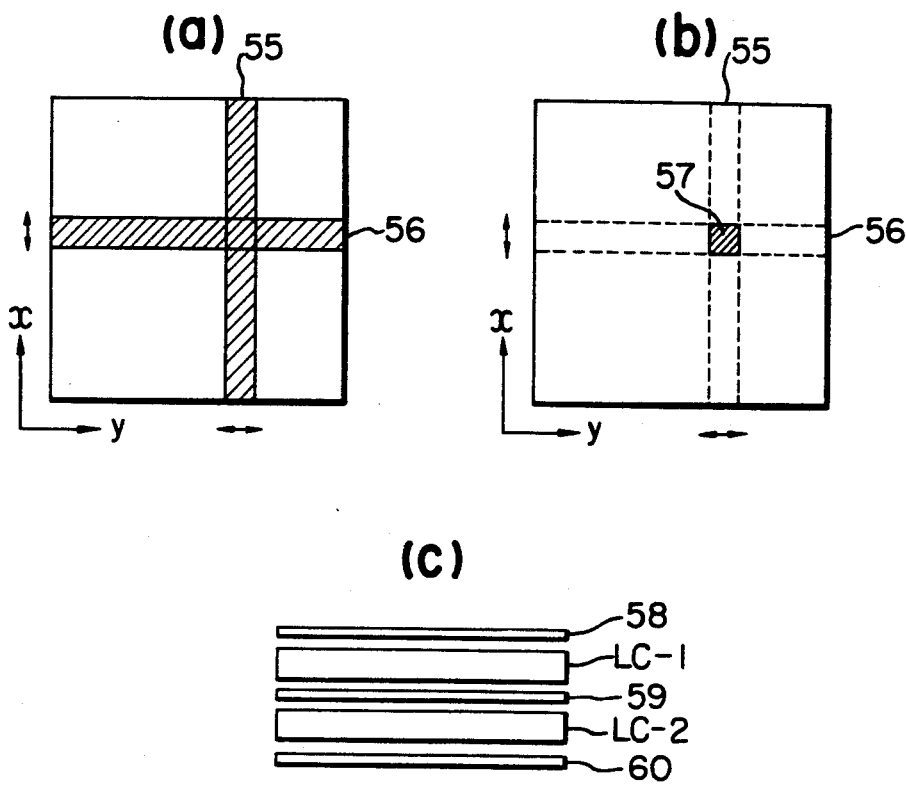
FIGS. 40(a) and (b) show further forms of the display and FIG. 40(c) is a schematic view showing the construction of the liquid crystal display cell for effecting such forms of the display.

FIG. 40 shows examples of display accomplished by two sets of liquid crystal cells LC in the basic form shown in FIG. 2 superposed upon each other and disposed between two polarizing plates with the display portions of such liquid crystal cells being orthogonal to each other. By using the liquid crystal cells of such construction, the liquid crystal display device of the present invention will find wide applications.

The liquid crystal display device shown in FIG. 40 is designed such that the potential gradient of the resistance layer of one liqiud crystal cell LC-1 is in the direction xx' and the potential gradient of the resistance layer of the other liquid crystal cell LC-2 is in the direction yy', and the cross-section of such liquid crystal display device is as shown in FIG. 40(c), wherein reference numeral 58 designates a first polarizing plate, LC-1 a first liquid crystal cell, 59 a second polarizing plate, LC-2 a second liquid crystal cell and 60 a third polarizing plate.

FIG. 40(i a) shows an example of display in which the overlap between one of the display portion 55 of the liquid crystal cell LC-1 and the display portion 56 of the liquid crystal cell LC-2 and the non-display portion of the other liquid crystal cell and the overlap between the display portion of the liquid crystal cell LC-1 and the display portion of the liquid crystal cell LC-2 are displayed dark. FIG. 40(b) shows an example in which display occurs in the portion 57 wherein the display portion 55 of the liquid crystal cell LC-1 is overlapped to the display portion 56 of the liquid crystal cell LC-2. In FIGS. 40(a) and (b), the display portions 55 and 56 are displaceable in x- and y-direction, respectively, so that they can analogously scan any desired point on the xy plane.

The liquid crystal display device of the present invention, as has specifically been described above, is not only very excellent but also widely applicable and highly effective and may enjoy commercially very high evaluation. The fields in which the device of the present invention will find effective applications include various types of measuring instruments, optical instruments, electrical instruments, etc., and an application thereof in a camera will hereinafter be described in detail.

Figure 41:
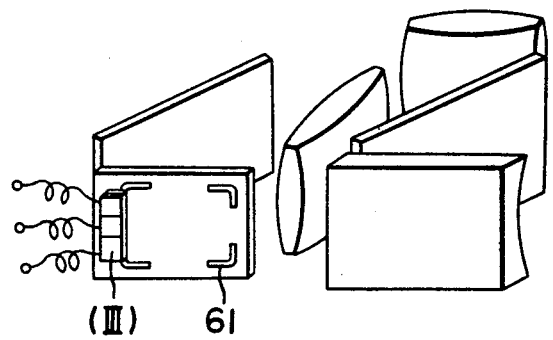
FIGS. 41 and 42(a) and (b) are schematic illustrations of the inventive liquid crystal display device as applied in a camera.
Figure 42:
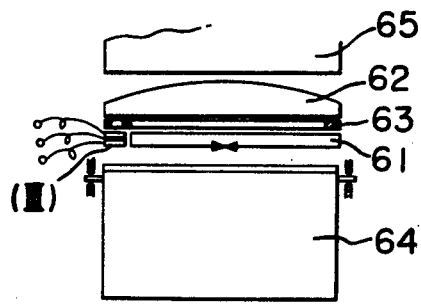
Figure 42:
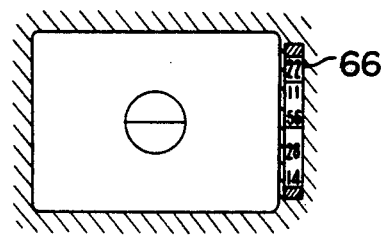

FIG. 41 shows the liquid crystal display cell (III) as incorporated in a bright frame type viewfinder. As shown, the cell (III) is incorporated in a field frame 61 provided to the conventional bright frame type veiwfinder so that, as will further be described, a display line may be displayed by the metering operation output while another display line may be displayed by a variable resistor which is variable in response to an aperture ring or a shutter dial, not shown. With such construction, it is possible to operate the aperture ring or the shutter dial while looking in the finder to bring the two display lines into accord and thereby set the camera to the exposure condition which will provide a proper exposure. FIG. 42 shows another application of the present liquid crystal display cell (III) in a single lens reflex camera. As shown in FIG. 42(a), the liquid crystal display cell (III) is juxtaposed with a focusing plate 61 whereby one can see the display, as well as the object image on the focusing plate, at the position of clear vision by looking in the finder eyepiece. A field mask 63 is disposed between a condenser lens 62 and the focusing plate 61 to enable the effective field portion and the liquid crystal display window portion 66 to be distinguishably seen, as shown in FIG. 42(b). Designated by 64 is a total reflection mirror and 65 a pentaprism. The provision of the field mask 63 prevents the boundary portion between the liquid crystal display cell (III) and the focusing plate 61 shown in FIG. 42(a) from looking unsightly. Again in this instance, proper exposure may be provided by bringing about coincidence between the display line from the metering operation output and the display line for the set value.

In addition, the liquid crystal display device of the present invention can be utilized in indicators such as volume indicator, range finder, flash meter, battery checker, etc. and is further applicable to thermometer, pressure gauge, speed meter, analog display timepiece, flux meter, etc.

What is claimed is:

1. A liquid crystal display device comprising:
   (a) a liquid crystal display cell, including
   a pair of mutually opposed base plates, at least one of said base plates being transparent; a resistance layer disposed on one of the opposed base plates and having connecting terminals provided on both ends thereof; an electrode layer disposed on a surface of the other base plate, opposed to said resistance layer, a nematic liquid crystal, said liquid crystal being a field effect twisted nematic liquid crystal, and being held between said resistance layer and said electode layer; and a pair of polarizing plates being disposed to hold therebetween said pair of base plates;
   (b) alternating current output means for generating an AC voltage and having output terminals coupled to the connecting terminals at both ends of said resistance layer so as to impart a potential gradient to said resistance layer;
   (c) control signal output means for generating AC voltage to control the display, wherein an output terminal of said means is connected to said electrode layer, and said AC voltage is smaller in peak to peak value than the AC voltage generated by said alternating current output means; and
   (d) synchronizing means connected to said AC output means and said control signal output means to cause the AC voltages from both said output means to be conformed in their frequencies, phases, wave forms and DC reference levels.

2. A liquid crystal display device as set forth in claim 1, wherein said resistance layer has a resistance value of 10 kΩ to 100 MΩ across the terminals.

3. A liquid crystal display device as set forth in claim 1, wherein said nematic liquid crystal contains Schiff's salt type liquid crystal.

4. A liquid crystal display device as set forth in claim 1, wherein said nematic liquid crystal contains ester type liquid crystal.

5. A liquid crystal display device as set forth in claim 1, wherein said nematic liquid crystal contains azo type liquid crystal.

6. A liquid crystal display device as set forth in claim 1, wherein said nematic liquid crystal contains azoxy type liquid crystal.

7. A liquid crystal display device as set forth in claim 1, wherein said nematic liquid crystal contains biphenyl type liquid crystal.

8. A liquid crystal display device as set forth in claim 1, wherein said pair of polarizing plates are linear polarizing plates, and are so disposed that the polarizing directions thereof may be mutually orthogonal or parallel.

9. A liquid crystal display device as set forth in claim 1, wherein said synchronizing means operates in such a manner that said AC voltage from said alternating current output means is coupled as an input to said control signal output means, and said AC output from said control signal output means is formed by resistance means for dividing said AC voltage to control the display by dividing said input AC voltage by resistance means.

10. A liquid crystal display device as set forth in claim 1, wherein a plurality of said liquid crystal display cells are laminated.

11. A liquid crystal display device as set forth in claim 1, wherein said control signal output means alternately generates a plurality of different AC voltages.

12. A liquid crystal display device as set forth in claim 11, wherein said control signal output means has a light receiving circuit for generating a voltage corresponding to brightness of an object to be photographed, an information establishing circuit for generating a voltage corresponding to a set aperture value or a shutter timing of a camera, and switching means for selecting outputs from said light receiving circuit and said information establishing circuit.

13. A liquid crystal display device as set forth in claim 12, wherein said switching means periodically changes over an output from said light receiving circuit and an output from said information establishing circuit, and said liquid crystal display cell apparently simultaneously displays lines corresponding to said both outputs.

14. A liquid crystal display device as set forth in claim 1, wherein the AC voltage from said AC output means is variable, and the potential gradient in the resistance layer varies.

15. A liquid crystal display device comprising:
(a) liquid crystal display cell including
at least three base plates, said base plates being disposed to provide at least two space intervals for holding liquid crystal therein; electrically conductive layers provided on each of the opposing surfaces of said base plates; nematic liquid crystal comprising a field effect twisted nematic liquid crystal, said crystal being held in said intervals between said electrically conductive layers; and a pair of polarizing plates disposed outside of said base plates;
(b) alternating current output means for generating an AC voltage coupled to said electrically conductive layers;
(c) control signal output means for generating an AC voltage coupled to said electrically conductive layers to control the display; and
(d) synchronizing means coupled to said AC output means and said control signal output means to cause the AC voltages from both said output means to be conformed in their frequencies, phases, wave forms and DC reference levels.

16. A liquid crystal display device as set forth in claim 15, wherein one of said mutually opposed electrically conductive layers is a resistance layer, and the other is an electrode layer having good electrical conductivity.

17. A liquid crystal display device as set forth in claim 15, wherein said mutually opposed electrically conductive layers are resistance layers.

18. A liquid crystal display device as set forth in claim 15, wherein the liquid crystal display areas differ in the respective said intervals.

19. A liquid crystal display device as set forth in claim 15, wherein there are provided two liquid crystal layers and two control signal output means, one of said control output means being provided with a light receiving element to emit a said AC output voltage corresponding to a measured light quantity, and the other being provided with a variable resistor to emit a said AC output voltage corresponding to an arbitrarily set value.

20. A liquid crystal display device comprising:
(a) a liquid crystal display cell, said liquid crystal display cell including
a pair of mutually opposed base plates, at least one of said base plates being transparent; a resistance layer provided on one of the opposed surfaces of said base plates, and having connecting terminals provided on both ends thereof; an electode layer provided on the surface of said other base plate opposed to said resistance layer; a nematic liquid crystal comprising a field effect twisted nematic liquid crystal, said crystal being held between said resistance layer and said electrode layer; and a pair of polarizing plates, said polarizing plates being so disposed as to hold therebetween said pair of base plates;
(b) AC output means for generating an AC voltage, said output means having an output terminal coupled to said connecting terminals at both ends of said resistance layer to impart a potential gradient to said resistance layer, and said AC output means comprising a power source, for producing a DC voltage, and converting means coupled to said power source for generating said voltage;
(c) control signal output means for generating an AC voltage to control the display, wherein an output terminal of said control signal output means is coupled to said electrode layer; and
(d) synchronizing means coupled to said AC output means and said control signal means to cause the AC voltages from both said output means to be conformed in their frequencies, phases, wave forms and DC reference levels.

21. A liquid crystal display device as set forth in claim 20, wherein said power source is a battery.

22. A liquid crystal display device as set forth in claim 20, wherein said synchronizing means operates in such a manner that said AC voltage from said AC output means is coupled as an input to said control signal output means, and said AC output from said control signal output means is selected from a range of voltages in the potential gradient imparted to said resistance layer, by dividing the said AC input voltage through said light receiving means and said variable resistance means, and the phase of said selected voltage is synchronized with the AC voltage applied to said resistance layer.

23. A liquid crystal display device as set forth in claim 20, wherein said synchronizing means has a pulse generating circuit, and said AC output means generates said AC voltage with a pulse from said pulse generating circuit.

24. A liquid crystal display device as set forth in claim 22, wherein said variable resistance means is interlocked with a photographic information setting in a camera.

25. A liquid crystal display device as set forth in claim 25, wherein said light receiving means comprises a first light receiving element having a resistance value which changes primarily in a high brightness zone, and a second light receiving element having a resistance value which changes primarily in a low brightness zone.

26. A liquid crystal display device as set forth in claim 25, wherein the resistance value of said first light receiving element is approximately ten times as large as the resistance value of said second light receiving element.

27. A liquid crystal display device comprising:
(a) a liquid crystal display cell, said liquid crystal display cell including
a pair of mutually opposed base plates, at least one of said base plates being transparent; a resistance layer provided on one of the opposed surfaces of said base plates, and having connecting terminals provided on both ends thereof; an electrode layer provided on the surface of said other base plate opposed to said resistance layer; a nematic liquid crystal comprisng a field effect twisted nematic liquid crystal, said crystal being held between said resistance layer and said electrode layer; and a pair of polarizing plates disposed as to hold said pair of base plates therebetween;
(b) a power source for providing a DC voltage output;
(c) a boosting power source circuit coupled to said power source for providing a boosted AC voltage output;
(d) a rectifying circuit coupled to said boosting power source circuit for rectifying said AC voltage;
(e) a low frequency pulse oscillating circuit;
(f) an interrupting circuit having inputs coupled to said rectifying circuit and said pulse oscillating circuit for generating for generating a low frequency AC voltage by interrupting the rectified direct current in response to said low frequency pulses, said interrupting circuit having an output terminal coupled to said connecting terminals at both ends of said resistance layer to impart a potential gradient to said resistance layer; and
(g) a control signal output circuit coupled to the output terminal of said interrupting circuit for generating a control AC voltage selected from a range of voltages in the potential gradient imparted to the resistance layer of said liquid crystal display cell, said control voltage being obtained by dividing an input AC voltage through said variable resistance means and said light receiving means, the phase of which is synchronized with the AC voltage applied to said resistance layer, wherein said control AC voltage is coupled to the electrode layer of said liquid crystal display cell.

28. A liquid crystal display device as set forth in claim 27, further comprising a protective circuit having an overcurrent detecting resistor interposed between an output terminal of said rectifying circuit and an input terminal of said interrupting circuit, and switching means for detecting a voltage decrease when an overcurrent flows through said overcurrent detecting resistance and for deactuating said pulse oscillating circuit.

29. A liquid crystal display device as set forth in claim 27, wherein said rectifying circuit is a double voltage rectifying circuit.

30. A liquid crystal display device as set forth in claim 27, wherein a resistance value of said variable resistance means is logarithmically established by being interlocked with a rotary knob in correspondence to a rotational angle of said knob.

31. A liquid crystal display device comprising:
(a) a liquid crystal display cell including
a pair of mutually opposed base plates, at least one of said base plates being transparent; a resistance layer provided on one of the opposed surfaces of said base plates, and having connecting terminals provided on both ends thereof; an electrode layer provided on the surface of said other base plate opposing to said resistance layer; a nematic liquid cyrstal comprising a field effect twisted nematic liquid crystal, said crystal being held between said resistance layer and said electrode layer; and a pair of polarizing plates disposed to hold said pair of base plates therebetween;
(b) a power source for providing a DC output voltage;
(c) a boosting power source circuit coupled to said power source for producing a boosted AC voltage output;
(d) a rectifying circuit connected to said boosting power source circuit;
(e) a low frequency pulse oscillating circuit;
(f) an interrupting circuit connected to an output terminal of said rectifying circuit and an output terminal of said pulse oscillating circuit for generating a low frequency AC voltage by interrupting the rectified direct current in response to said low frequency pulses, and having an output terminal coupled to said connecting terminals at both ends of said resistance layer to impart a potential gradient to said resistance layer;
(g) a metering circuit connected to said power source, for emitting a light measurement signal by dividing the DC voltage with said light receiving means and said variable resistance means;
(h) a metering signal interrupting circuit connected to an output terminal of said metering circuit and an output terminal of said pulse oscillating circuit to perform on-off operations of said metering signal in response to said low frequency pulses, and to generate a low frequency AC metering signal which is synchronized with the AC voltage output from said interrupting circuit; and
(i) an amplifier circuit for increasing the AC metering signal output from said metering signal interrupting circuit, and for generating an AC voltage selected from a range in the potential gradient imparted to said resistance layer of said liquid crystal display cell, wherein an output terminal of said amplifier circuit is connected to the electrode layer of said liquid crystal display cell.

32. A liquid crystal display device comprising:
(a) a liquid crystal display cell including
a pair of mutually opposed base plates, at least one of said base plates being transparent; a first resistance layer provided on one of the opposed surfaces of said base plates, and having connecting terminals at both ends thereof; a second resistance layer provided on the other of the mutually opposed surfaces of said base plates opposite to said first resistance layer, and having connecting terminals at both ends thereof; a nematic liquid crystal comprising a field effect twisted nematic liquid crystal, and being held between said first resistance layer and said second resistance layer; and a pair of polarizing plates disposed to hold said pair of base plates therebetween;

(b) a first control signal output circuit for generating an AC voltage to control the display, an output terminal thereof being connected to said first resistance layer;

(c) a second control signal output circuit for generating an AC voltage to control the display, an output terminal thereof being connected to said second resistance layer; and (d) synchronizing means connected to said first control signal output circuit and said second control signal output circuit for causing the AC voltage from both said output means to be conformed in their frequencies, phases and DC reference levels.

33. A liquid crystal display device as set forth in claim 32, wherein said synchronizing means operates by dividing the AC voltage from said AC output circuit through said resistance means, and generates an AC voltage to control the display.

34. A liquid crystal display device as set forth in claim 32, wherein said first control signal output circuit alternately produces a plurality of different AC voltage outputs, and said liquid crystal display cell displays, apparently simultaneously, a plurality of display lines.

35. A liquid crystal display device comprising:

(a) a liquid crystal display cell having:
a pair of mutually opposed base plates; at least one of said base plates being transparent; a first resistance layer provided on one of the opposed surfaces of said base plates, and being provided at both ends thereof with connecting terminals; a second resistance layer provided on the other of said mutually opposed surfaces of said base plates opposite to said first resistance, and being provided at both ends thereof with connecting terminals; a nematic liquid crystal comprising a field effect twisted nematic liquid crystal held between said first resistance layer and said second resistance layer; and a pair of polarizing plates disposed to hold said pair of base plates therebetween;

(b) an AC output circuit for generating an AC voltage applied to said connecting terminals of said resistance layer;

(c) a first control signal output circuit having a first resistance means and a first signal input means for coupling to said AC output circuit, wherein a junction between said first resistance means and said first signal input means is coupled to one of said connecting terminals of said resistance layer; and (d) a second control signal output circuit, said circuit having a second signal input means and a second resistance means for coupling to said AC output circuit, wherein a junction between said second resistance means and said second signal input means is coupled to the other said connecting terminal of said resistance layer.

36. A liquid crystal display device as set forth in claim 35, wherein said first signal input means and said second signal input means are variable resistors.

37. A liquid crystal display device as set forth in claim 35, wherein said first signal input means and said signal input means are light receiving elements.

38. A liquid crystal display device as set forth in claim 35, wherein said coupling between said first resistance means and said one connecting terminal is through a first resistor and the coupling between said second signal input means and said other connecting terminal is through a second resistor.

39. A liquid crystal display device comprising:
(a) a liquid crystal display cell including
a pair of mutually opposed base plates, at least one of said base plates being transparent; a first resistance layer provided on one of the opposed surfaces of said base plates, and being provided at both ends thereof with connecting terminals; a second resistance layer provided on the other of said mutually opposed surfaces of said base plates opposite to said first resistance and being provided at both ends thereof with connecting terminals; a nematic liquid crystal comprising a field effect twisted nematic liquid crystal, and being held between said first resistance layer and said second resistance layer; and a pair of polarizing plates disposed to hold said pair of base plates therebetween;

(b) an alternating current output circuit for generating an altern-ting current voltage, and having an output terminal connected to one of said connecting terminals of said first resistance layer, and to one of connecting terminals of said second resistance layer;

(c) a control signal output circuit for generating an AC voltage, to control the display, and having the output from said AC output circuit as an input thereto, and having an output terminal thereof being connected to the other end of said first resistance layer; and (d) an inverting circuit for inverting the output from said control signal output circuit, and having an output terminal connected to the other connecting terminal of said second resistance layer.

40. A liquid crystal display device as set forth claim 39, wherein said control signal output circut has a photoconductive element and resistance means mutually connected in series, and produces an output voltage from a connecting point between said photoconductive element and said resistance means.

41. A liquid crystal display device as set forth in claim 39, wherein said control signal output circuit has a silicon photo-cell and a compressing diode, connected in series, and produces an output voltage from a connecting point between said silicon photo-cell and said compressing diode.

* * * * *

UNITED STATES PATENT OFFICE
CERTIFICATE OF CORRECTION

Patent No. 4,139,278　　　Dated February 13, 1979

Inventor(s) SEIICHI MATSUMOTO, ET AL.

It is certified that error appears in the above-identified patent and that said Letters Patent are hereby corrected as shown below:

Column 1, line 38, "function" should read --functional--;

Column 13, line 16, "actually" should read --usually--;

Column 20, line 13, "of varying" should read --for varying--; "tht" should read --that;

Column 20, line 35, "shown in Fig. 18(a)," should read --shown in Fig. 18(a). In Fig. 18(a),--;

Column 20, line 66, "V1 + V2)" should read --(V1 + V2)--;

Column 21, line 16, "is" (first occurrence) should read --in--;

Column 21, line 22, "Fig." should read --Figs.--;

Column 22, line 10, "lie" should read --line--;

Column 22, line 22, "of" should read --for--;

Column 23, line 26, "voltage" should read --voltages--;

Column 23, line 38, "24()" should read --24(a)--; delete "a" before "photoconductive";

Column 24, line 41, "the" (second occurrence) should read --be--;

UNITED STATES PATENT OFFICE
CERTIFICATE OF CORRECTION

Patent No.  4,139,278           Dated February 13, 1979

Inventor(s)  SEIICHI MATSUMOTO, ET AL.

It is certified that error appears in the above-identified patent and that said Letters Patent are hereby corrected as shown below:

Column 28, line 31, "provied" should read --provided--;

Column 29, line 20, "liqiud" should read --liquid--;

Column 30, line 35, Claim 1, "electode" should read --electrode--;

lines 35 to 37, "and a pair of polarizing plates being disposed to hold therebetween said pair of base plates;"

should read

--and a pair of polarizing plates, said polarizing plates being disposed to hold therebetween said pair of base plates;--;

Column 32, line 24, Claim 20, "electode" should read --electrode--;

UNITED STATES PATENT OFFICE
CERTIFICATE OF CORRECTION

Patent No. 4,139,278    Dated February 13, 1979

Inventor(s) SEIICHI MATSUMOTO, ET AL.

It is certified that error appears in the above-identified patent and that said Letters Patent are hereby corrected as shown below:

Column 33, line 5, Claim 25, "25" should read --22--;

Column 33, line 24, Claim 27, "comprisng" should read --comprising--.

Signed and Sealed this

Thirtieth Day of October 1979

[SEAL]

Attest:

RUTH C. MASON
Attesting Officer

LUTRELLE F. PARKER
Acting Commissioner of Patents and Trademarks